US012801682B2

(12) United States Patent
Kakuko et al.

(10) Patent No.: US 12,801,682 B2
(45) Date of Patent: Nov. 17, 2026

(54) INFORMATION PROCESSING APPARATUS, INFORMATION PROCESSING METHOD, AND COMPUTER-READABLE RECORDING MEDIUM STORING PROGRAM OF SEARCHING FOR PARAMETER

(71) Applicant: FUJITSU LIMITED, Kawasaki (JP)

(72) Inventors: Norihiro Kakuko, Kawasaki (JP); Matthieu Parizy, Meguro (JP)

(73) Assignee: FUJITSU LIMITED, Kawasaki (JP)

( * ) Notice: Subject to any disclaimer, the term of this patent is extended or adjusted under 35 U.S.C. 154(b) by 1121 days.

(21) Appl. No.: 17/869,813

(22) Filed: Jul. 21, 2022

(65) Prior Publication Data

US 2023/0169386 A1 Jun. 1, 2023

(30) Foreign Application Priority Data

Nov. 26, 2021 (JP) ................................ 2021-192401

(51) Int. Cl.
*G06F 17/11* (2006.01)

(52) U.S. Cl.
CPC .................................... *G06F 17/11* (2013.01)

(58) Field of Classification Search
CPC ..... G06F 17/11; G06F 16/90335; G06N 7/01; G06N 3/047
See application file for complete search history.

(56) References Cited

U.S. PATENT DOCUMENTS

2006/0010091 A1 1/2006 Wada
2020/0090026 A1 3/2020 Shibasaki
2020/0393798 A1* 12/2020 Kushibe .................. G06N 5/01
(Continued)

FOREIGN PATENT DOCUMENTS

JP H09-034951 A 2/1997
JP 2020-046718 A 3/2020
JP 2021-174313 A 11/2021

OTHER PUBLICATIONS

Wolschin et al., One and Two Dimensional Ising Model (2021), pp. 1-14 [retrieved from https://www.thphys.uni-heidelberg.de/~wolschin/statsem21_3s.pdf]. (Year: 2021).*
(Continued)

*Primary Examiner* — Brian W Wathen
(74) *Attorney, Agent, or Firm* — Fujitsu Intellectual Property Center

(57) ABSTRACT

An apparatus of searching for a parameter used in an energy function of an Ising model that corresponds to a problem, the apparatus being configured to obtain information that indicates the energy function; performing a first processing a plurality of times, the first processing including obtaining a first candidate value from a first range, the first range being a candidate value range of the parameter to be used for a search for a solution of the problem based on the energy function, and evaluating the first candidate value according to a result of the search in a case where the first candidate value is used as a value of the parameter; changing the candidate value range from the first range to a second range narrower than the first range; performing a second processing a plurality of times, the second processing including obtaining a second candidate value from the second range.

12 Claims, 8 Drawing Sheets

(56) References Cited

U.S. PATENT DOCUMENTS

| | | | | |
|---|---|---|---|---|
| 2021/0216608 | A1* | 7/2021 | Koyama | G06F 17/11 |
| 2021/0334332 | A1* | 10/2021 | Koyama | G06F 17/11 |
| 2022/0245204 | A1* | 8/2022 | Shimada | G06N 3/126 |
| 2024/0394328 | A1* | 11/2024 | Takesue | G06F 17/11 |

OTHER PUBLICATIONS

Cook et al., "Combinatorial Optimization" (1997), pp. 1-53 [retrieved from https://www.math.uwaterloo.ca/~bico/papers/cobook_select.pdf]. (Year: 1997).*

European Office Action dated Oct. 13, 2023 for corresponding European Patent Application No. 22186941.5, 7 pages *Please note D1-D5 cited herewith, were previously cited in an IDS filed on Feb. 15, 2023.*.

Goh, Siong Thye et al., "A Hybrid Framework Using a QUBO Solver for Permutation-Based Combinatorial Optimization", arxiv.org, Cornell University Library, 201 Olin Library Cornell University Ithaca, NY 14853, XP091000804, pp. 1-23, Jul. 6, 2021.

Huang, Tian et al., "QROSS: QUBO Relaxation Parameter Optimisation via Learning Solver Surrogates", arxiv.org, Cornell University Library, 201 Olin Library Cornell University Ithaca, NY 14853, XP081913353, pp. 1-17, Mar. 19, 2021.

Mills, Kyle et al., "Finding the ground state of spin Hamiltonians with reinforcement learning", arxiv.org, Cornell University Library, 201 Olin Library Cornell University Ithaca, NY 14853, XP081894728, pp. 1-13, Mar. 11, 2021.

Lou, Zhihao et al., "Parallel simulated annealing using an adaptive resampling interval", Parallel Computing, vol. 53, XP029482445, pp. 23-31, Feb. 10, 2016.

Gunawan, Aldy et al., "Second Order-response Surface Model for the Automated Parameter Tuning Problem", 2014 IEEE International Conference on Industrial Engineering and Engineering Management, XP032744760, pp. 652-656, Dec. 9, 2014.

Parizy, Matthieu et al., "Analysis and Acceleration of the Quadratic Knapsack Problem on an Ising Machine", IEICE Transactions on Fundamentals of Electronics, Communications and Computer Sciences, vol. E104-A, No. 11, XP093006364, pp. 1526-1535, Nov. 2021.

Franzin, Alberto et al., "Revisiting simulated annealing: A component-based analysis", Computers and Operations Research, vol. 104, XP085582110, pp. 191-206, Dec. 19, 2018.

Ingber, Lester, "Adaptive simulated annealing (ASA): Lessons learned", arxiv.org, Cornell University Library, 201 Olin Library Cornell University Ithaca, NY 14853, XP080009967, pp. 1-26, Jan. 23, 2000.

Extended European Search Report dated Dec. 23, 2022 for corresponding European Patent Application No. 22186941.5, 10 pages.

European Office Action dated May 13, 2025 for corresponding European Patent Application No. 22186941.5, 11 pages *Please note D1-D5 were previously cited in an IDS filed on Feb. 15, 2023.*.

Japanese Office Action dated Sep. 2, 2025 for corresponding Japanese Patent Application No. 2021-192401, with English Translation, 6 pages.

European Office Action dated Oct. 20, 2025 for European Patent Application No. 22186941.5, 19 pages *Please note references D1-D5 were previously cited in an IDS filed on Feb. 15, 2023.*.

* cited by examiner

FIG. 4

140

EVALUATION RESULT STORAGE UNIT

141

| PARAMETER EVALUATION TABLE | | | |
|---|---|---|---|
| ITEM NUMBER | MAXIMUM TEMPERATURE VALUE | MINIMUM TEMPERATURE VALUE | EVALUATION VALUE |
| 1 | Tmax1 | Tmin1 | V11 |
| 2 | Tmax2 | Tmin2 | V12 |
| ... | ... | ... | ... |

INFORMATION PROCESSING APPARATUS, INFORMATION PROCESSING METHOD, AND COMPUTER-READABLE RECORDING MEDIUM STORING PROGRAM OF SEARCHING FOR PARAMETER

CROSS-REFERENCE TO RELATED APPLICATION

This application is based upon and claims the benefit of priority of the prior Japanese Patent Application No. 2021-192401, filed on Nov. 26, 2021, the entire contents of which are incorporated herein by reference.

FIELD

The embodiments discussed herein are related to an information processing apparatus, an information processing method, and a non-transitory computer-readable recording medium storing a program of searching for a parameter.

BACKGROUND

An information processing apparatus may be used for finding a solution to a combinatorial optimization problem. An information processing apparatus converts a combinatorial optimization problem into an energy function of an Ising model that is a model representing a behavior of a spin of a magnetic body, and searches for a combination that minimizes a value of the energy function among combinations of values of state variables included in the energy function. The combination of the values of the state variables that minimizes the value of the energy function corresponds to a ground state or an optimum solution expressed by a set of state variables.

As a method for acquiring an approximate solution of a combinatorial optimization problem in a practical time, a simulated annealing (SA) method, a replica-exchange method, and the like based on a Markov-chain Monte Carlo (MCMC) method are applied. A parameter that represents a temperature value, or the like is used in a search for a solution by the SA method, the replica-exchange method, or the like. Thus, a method for determining a value of the parameter has been considered.

For example, there is a proposal for an optimization apparatus that determines a minimum value of a temperature parameter from a resolution of an energy of an Ising model and an acceptable probability of state transition of the Ising model when the temperature parameter is the minimum value. Based on a maximum value of a change in energy determined from the number of state variables included in the Ising model and weight coefficients indicating weights among the state variables, the proposed optimization apparatus also determines the maximum value of the temperature parameter from an acceptable probability when the temperature parameter is the maximum value.

A combinatorial optimization method for solving a combinatorial optimization problem having a plurality of evaluation items by using the SA method has been proposed. The proposed combinatorial optimization method dynamically changes weight coefficients of each evaluation item along with a change in the temperature parameter.

A solution search apparatus that searches for a solution by a genetic algorithm using parameters having predetermined search ranges has also been proposed. The proposed solution search apparatus stores gene data having a plurality of parameters. The solution search apparatus generates parameter values such that the logarithmic values of parameter values corresponding to at least a part of the search range of an input parameter have a predetermined distribution, and searches for a solution by the genetic algorithm using the parameter for which the parameter values are set.

Examples of the related art include Japanese Laid-open Patent Publication No. 2020-46718, Japanese Laid-open Patent Publication No. 9-34951, and U.S. Patent Application Publication No. 2006/0010091 Specification are disclosed as related art.

SUMMARY

According to an aspect of the embodiments, there is provided an information processing apparatus of searching for a parameter, the information processing apparatus including: a memory configured to store information that indicates an energy function of an Ising model that corresponds to a problem; and a processor configured to perform processing including: obtaining the information stored in the memory; performing a first processing a plurality of times, the first processing including, obtaining a first candidate value from a first range, the first range being a candidate value range of the parameter to be used for a search for a solution of the problem based on the energy function, and evaluating the first candidate value according to a result of the search in a case where the first candidate value is used as a value of the parameter; changing the candidate value range from the first range to a second range narrower than the first range; performing a second processing a plurality of times, the second processing including obtaining a second candidate value from the second range, and evaluating the second candidate value according to a result of the search in a case where the second candidate value is used as a value of the parameter; and determining, based on at least any one of a first difference or an index, a timing at which the candidate value range is changed from the first range to the second range and a second difference between the first range and the second range, the first difference being a difference between a best evaluation value and another evaluation value, the best evaluation value being any one of a plurality of first evaluation values calculated by the performing of the first processing the plurality of times, the another evaluation value being an evaluation value obtained by the first processing performed before the first processing of the best evaluation value, the index indicating a nature of the problem according to the energy function.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram illustrating an example of a parameter evaluation table;

DESCRIPTION OF EMBODIMENTS

A value of a parameter used in the SA method, the replica-exchange method, or the like affects solution finding performance of an information processing apparatus. Thus, in order to determine the value of the parameter to be used in the SA method, the replica-exchange method, or the like, the information processing apparatus may perform a parameter search before an actual search for a solution.

In the parameter search, the information processing apparatus repeatedly performs processing of extracting a candidate value of a parameter from values belonging to a predetermined range and evaluating the candidate value based on a result of a trial of a solution search using the extracted candidate value, for each candidate value within the predetermined range. Among the candidate values, the information processing apparatus adopts a candidate value with a good evaluation result as a value of the parameter to be actually used.

However, in the parameter search, as the candidate value range is wider, the number of candidate values to be evaluated increases, and it takes long time to determine the value of the parameter. On the other hand, when the number of candidate values to be evaluated is excessively reduced by narrowing the candidate value range, there is a possibility that a better candidate value deviates from the range and the value of the parameter may not be appropriately determined.

According to one aspect, it is an object of the embodiments to provide an information processing apparatus, an information processing method, and a non-transitory computer-readable recording medium storing a program that improve the efficiency of parameter search.

The present embodiments will be described below with reference to the accompanying drawings.

First Embodiment

A first embodiment will be described.

Figure 1:
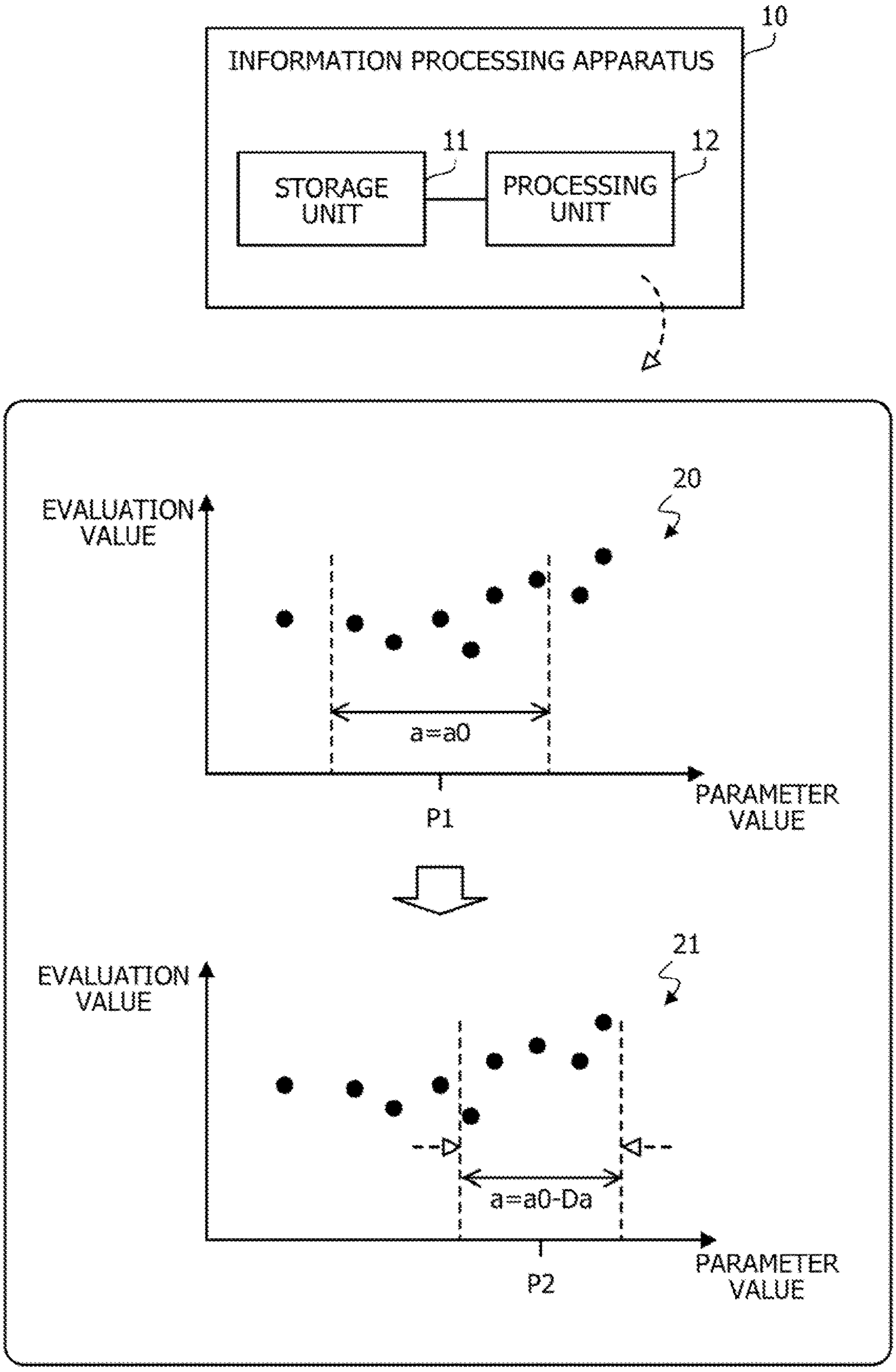
FIG. 1 is a diagram for describing an information processing apparatus according to a first embodiment.

FIG. 1 is a diagram illustrating an information processing apparatus according to the first embodiment.

An information processing apparatus 10 searches for a solution to a combinatorial optimization problem by using an MCMC method, and outputs the searched solution. For example, the information processing apparatus 10 uses an SA method based on the MCMC method, a parallel tempering (PT) method, or the like to search for a solution. The PT method is also referred to as a replica-exchange method. The information processing apparatus 10 includes a storage unit 11, and a processing unit 12.

The storage unit 11 may be a volatile storage device such as a random-access memory (RAM), or may be a non-volatile storage device such as a flash memory. The storage unit 11 may include an electronic circuit such as a register. The processing unit 12 may be an electronic circuit such as a central processing unit (CPU), a digital signal processor (DSP), an application-specific integrated circuit (ASIC), a field-programmable gate array (FPGA), or a graphics processing unit (GPU). The processing unit 12 may be a processor that executes a program. The "processor" may include a set of a plurality of processors (multiprocessor).

An example in which the processing unit 12 searches for a solution will be described below. However, a search unit implemented by an FPGA, a GPU, or the like that is different from the processing unit 12 may search for a solution in accordance with an instruction from the processing unit 12, and may return a search result to the processing unit 12.

The combinatorial optimization problem is formulated by an Ising-type energy function and is replaced with, for example, a problem that minimizes a value of an energy function. An energy function may also be referred to as an objective function, an evaluation function, or the like. The energy function includes a plurality of state variables. Each state variable is a binary variable having a value of 0 or 1. A state variable may also be referred to as a bit. A solution of the combinatorial optimization problem is represented by values of the plurality of state variables. The solution that minimizes the value of the energy function represents a ground state of an Ising model, and corresponds to an optimum solution of the combinatorial optimization problem. The value of the energy function is expressed as an energy.

The energy function of the Ising-type is represented by Expression (1).

$$E(x) = -\sum_{\langle i,j \rangle} W_{ij} x_i x_j - \sum_i b_i x_i \tag{1}$$

A state vector x has a plurality of state variables as elements, and represents a state of the Ising model. Expression (1) is an energy function formulated in a quadratic unconstrained binary optimization (QUBO) form. In a case of a problem of maximizing an energy, a sign of the energy function may be reversed.

A first term on the right side of Expression (1) is obtained by integrating a product of values of two state variables and a weight coefficient without omission and duplication for all combinations of two state variables that are selectable from all state variables. Subscripts i and j are indices of state variables. $x_i$ is an i-th state variable. $x_j$ is a j-th state variable. $W_{ij}$ is a weight between the i-th state variable and the j-th state variable or a weight coefficient indicating a strength of coupling. $W_{ij}$ is $W_{ji}$, and $W_{ii}$ is 0.

A second term on the right side of Expression (1) is a sum of a product of a value of the state variable and a bias for each of all the state variables. $b_i$ indicates a bias for the i-th state variable. Problem information including a weight coefficient, a bias, and the like included in the energy function is stored in the storage unit 11. An energy change amount $\Delta E_i$ due to a change in the state variable $x_i$ is represented by Expression (2).

$$\Delta E_i = (2x_i - 1)\left(\sum_j W_{ij} x_j + b_i\right) \tag{2}$$

When the state variable $x_i$ satisfying $\Delta E_i<0$ changes, an energy E(x) in Expression (1) decreases. $\Delta E_i$ may be defined such that E(x) decreases when the state variable $x_i$ satisfying $\Delta E_i>0$ changes. The processing unit 12 calculates a change amount of the value of the energy function due to a change in a value of one state variable among the plurality of state variables, for each of the plurality of state variables, and stochastically preferentially accepts the change in which the value of the energy function decreases.

At this time, in a case of falling into a local solution in using a steepest descent method, it is impossible to escape from the local solution. The processing unit 12 uses a Metropolis method or a Gibbs method to determine a probability of transition from a certain state to the next state of the Ising model due to changing a certain state variable. For example, the processing unit 12 also stochastically accepts a change of increasing the value of the energy function, in accordance with comparison between the amount of a change in the value of the energy function and a thermal noise value. The thermal noise value is obtained based on a temperature value or a random number. As the temperature value increases, the amplitude of the thermal noise value increases. As the amplitude of the thermal noise value increases, the state transition with a large increase amount of the value of the energy function is likely to be accepted.

For example, in the SA method, the processing unit 12 gradually changes a temperature value T from a maximum temperature value to a minimum temperature value to decrease the amplitude of the thermal noise value, and causes the state of the Ising model to converge to a ground state. In the replica-exchange method, the processing unit 12 independently executes an MCMC method by using a plurality of temperature values from a maximum temperature value to a minimum temperature value, exchanges the temperature values at a predetermined timing with respect to a state obtained at each temperature value, and determines a best solution finally obtained as a solution of the combinatorial optimization problem.

For example, in the SA method or the replica-exchange method, a parameter such as a maximum temperature value or a minimum temperature value is used. A value of the parameter affects solution finding performance. For example, when the value of the parameter is not appropriate, a period of time until a relatively good solution is obtained becomes excessively long, or an appropriate solution may not be obtained.

Thus, the processing unit 12 performs a parameter search for determining a parameter to be used for the corresponding problem. In the parameter search, the processing unit 12 acquires a candidate value from an acquisition target range that is a range within which a candidate value of the parameter is to be acquired, and evaluates the candidate value in accordance with a result of a search for a solution for a certain period of time by using the acquired candidate value. The acquisition target range may also be referred to as a candidate value range. For example, acquisition of the candidate value and acquisition of an evaluation result of the candidate value, for example, an evaluation value correspond to one time of evaluation. As a method for acquiring candidate values from the acquisition target range, for example, there are a method for acquiring candidate values in a round-robin manner such as a grid search and a method for randomly acquiring candidate values such as a random search. A method such as the SA method or the replica-exchange method that is actually used is used to search for a solution for a certain period of time in the parameter search.

In evaluation of a candidate value, the processing unit 12 evaluates, for example, a minimum energy reached in the search for the solution for the certain period of time, or a period of time until reaching the minimum energy, and calculates an evaluation value for the candidate value. As the reached minimum energy is smaller, the processing unit 12 determines the evaluation value of the candidate value as a better evaluation value. As the period of time until reaching the minimum energy is shorter, the processing unit 12 determines the evaluation value of the candidate value as a better evaluation value. The processing unit 12 calculates an evaluation value for each candidate value, adopts the candidate value corresponding to the best evaluation value among the evaluated candidate values as a value of the corresponding parameter, and uses the candidate value for an actual search for a solution.

As described above, the search for the solution may be performed by the processing unit 12, or may be performed by a search unit other than the processing unit 12. The number of parameters to be targeted for the parameter search may be plural. The processing unit 12 may perform evaluation for a set of candidate values of a plurality of parameters. In this case, an acquisition target range is determined for each of the plurality of parameters. In addition to the maximum temperature value and the minimum temperature value, a decrease range of the temperature value in the SA method or the like may be included in the parameters.

In the parameter search, the processing unit 12 performs processing of narrowing an acquisition target range for a candidate value of a parameter at a certain timing. The processing unit 12 determines the candidate value corresponding to the best evaluation value among evaluation values obtained up to the timing as a new center value of the acquisition target range, and sets a width $\alpha$ of the acquisition target range to $\alpha=\alpha0-\Delta\alpha$ by making the width $\alpha$ narrower than the immediately preceding width $\alpha=\alpha0$. $\Delta\alpha$ is a positive real number. At this time, the processing unit 12 determines a timing at which the acquisition target range is narrowed and an amount $\Delta\alpha$ by which the acquisition target range is narrowed by any of the following first to third methods.

According to the first method, the processing unit 12 determines the timing and the narrowing amount $\Delta\alpha$ based on a difference between the best evaluation value among the evaluation values calculated for the candidate values by the evaluation for the predetermined period of time by using the current acquisition target range and another evaluation value obtained before the evaluation of the best evaluation value. In this case, the timing is determined by a period of time $\tau1$ from a time point when the predetermined period of time described above is completed. The period of time $\tau1$ may be determined by the number of times of the parameter evaluation from the time point.

For example, in a case where the processing unit 12 obtains N evaluation values by performing the parameter evaluation N times for the predetermined period described above, the processing unit 12 obtains a best evaluation value V1 among the N evaluation values. The processing unit 12 obtains an evaluation value V2 obtained in evaluation before the predetermined number of times k from the evaluation in which the best evaluation value is obtained. The predetermined number of times k is input to the information processing apparatus 10 by a user in advance.

As V1-V2 is larger, it is estimated that convergence of the evaluation value is less progressed. For this reason, it is estimated that it takes a relatively long time until a relatively good candidate value is obtained within the current acquisition target range as V1-V2 increases. Thus, as V1-V2 increases, the processing unit 12 delays the timing of narrowing the acquisition target range. Delaying the timing corresponds to increasing the period of time $\tau1$. As V1-V2 increases, convergence of the evaluation value is less progressed, and thus, it is estimated that there is a high possibility that a good candidate value may be found when candidate values in a wider range are evaluated in the next narrowing down of the acquisition target range. Thus, the processing unit 12 decreases the amount Δα by which the acquisition target range is narrowed as V1-V2 increases. V1-V2 corresponds to a first difference. Δα corresponds to a second difference.

On the other hand, as V1-V2 decreases, it is estimated that the convergence of the evaluation value is more progressed. For this reason, it is estimated that, as V1-V2 decreases, it takes a relatively short time until a better candidate value is obtained in the current acquisition target range. Thus, as V1-V2 decreases, the processing unit 12 advances the timing of narrowing the acquisition target range. Advancing the timing corresponds to decreasing the period of time τ1. As V1-V2 decreases, the convergence of the evaluation value is more progressed, and thus, it is estimated that there is a high possibility that a good candidate value may be found even when candidate values in a narrower range are to be evaluated in the next narrowing down of the acquisition target range. Thus, as V1-V2 decreases, the processing unit 12 increases the amount Δα by which the acquisition target range is narrowed.

According to the second method, instead of the first method, the processing unit 12 determines the timing at which the acquisition target range is narrowed and the amount Δα by which the acquisition target range is narrowed, based on an index indicating a nature of the problem corresponding to the energy function. According to the second method, at a stage where the information of the energy function is input to the information processing apparatus 10, the processing unit 12 may determine the timing at which the acquisition target range is narrowed and the narrowing amount Δα, based on the information of the energy function. In this case, the timing may be determined by a period of time τ2 from a time point at which the parameter search in a certain acquisition target range is started. The period of time τ2 may be determined by the number of times of the parameter evaluation from the time point.

The index indicating the nature of the problem indicates the difficulty level of the problem. For example, the index may be an index corresponding to at least one of the number of state variables, the type of a constraint, and the number of constraints that are included in the energy function. An energy function E of Expression (1) may include a constraint term C. Types of the constraint term C include a 1w1h (1 way 1 hot) constraint, a 2w1h (2 way 1 hot) constraint, and the like. When the 1w1h constraint is used, C=C1 in Expression (3) is added to Expression (1), for example.

$$C1 = c_t\left(\sum_{i\in K_t} x_i - 1\right)^2 \tag{3}$$

t is 0, 1, . . . , T−1. T corresponds to the number of constraints indicating the 1w1h constraint. $c_t$ is a constant, and is a positive real number. Among a group $K_t$ of state variables, C1 takes a small value when only one state variable is 1 and the other state variables are 0. For example, the group $K_t$ is defined as $K_t=\{x_0, x_1, x_2\}$, $\{x_4, x_5, \ldots, x_{10}\}$, $\{x_{11}, x_{15}, \ldots, x_{20}\}$, or the like.

For example, in a case where the 2w1h constraint is used, when $x_{jk}=x_{j*L+k}$ is satisfied, C=C2 in Expression (4) is added to Expression (1). Note that j is 0, 1, . . . , L−1, and k is 0, 1, . . . , L−1.

$$C2 = c_j\left(\left(\sum_{k=0}^{L-1} x_{jk} - 1\right)^2 + \left(\sum_{k=0}^{L-1} x_{kj} - 1\right)^2\right) \tag{4}$$

L corresponds to the number of constraints indicating the 2w1h constraint. $c_j$ is a constant, and is a positive real number. When a plurality of state variables are treated as L rows and L columns, C2 takes a small value when only one state variable among the state variables of each row is 1 and only one state variable among the state variables of each column is 1.

As the number of state variables in the energy function increases, a difficulty level of the problem increases. As the number of constraints increases, the difficulty level of the problem increases. As the number of more strict types of constraints increases, the difficulty level of the problem increases. For example, the 2w1h constraint is the type of a constraint that is stricter than the 1w1h constraint.

As the difficulty level of the problem is higher, the processing unit 12 delays the timing of narrowing the acquisition target range and reduces the narrowing amount Δα. On the other hand, as the difficulty level of the problem is lower, the processing unit 12 advances the timing of narrowing the acquisition target range and increases the narrowing amount Δα. As the difficulty level of the problem is higher, it is more difficult to determine an appropriate value of the parameter, and a larger number of candidate values are to be evaluated in order to obtain a better candidate value. Delaying the timing corresponds to increasing the period of time τ2, and advancing the timing corresponds to decreasing the period of time τ2.

According to the third method, the processing unit 12 uses both the first method and the second method to determine the timing at which the acquisition target range is narrowed and the amount Δα by which the acquisition target range is narrowed. In this case, the timing is determined by the period of time τ1 from the time point at which the predetermined period in the first method is completed.

As V1-V2 is larger, the processing unit 12 delays the timing of narrowing the acquisition target range and reduces the narrowing amount Δα. As the difficulty level of the problem is higher, the processing unit 12 delays the timing of narrowing the acquisition target range and decreases the narrowing amount Δα. Delaying the timing corresponds to increasing the period of time τ1.

On the other hand, as V1-V2 is smaller, the processing unit 12 advances the timing of narrowing the acquisition target range and increases the narrowing amount Δα. As the difficulty level of the problem is lower, the timing at which the acquisition target range is narrowed is advanced and the narrowing amount Δα is increased. Advancing the timing corresponds to decreasing the period of time τ1.

Graphs 20 and 21 indicate an example of a relationship between candidate values of the parameter, for example, parameter values and evaluation values. Horizontal axes of the graphs 20 and 21 indicate parameter values. Vertical axes of the graphs 20 and 21 indicate evaluation values. For example, as the evaluation value is larger, the evaluation of the corresponding candidate value is higher.

The graph 20 illustrates an acquisition target range before a change for the parameter values. A center value of the acquisition target range before the change is P1, and a width of the acquisition target range is α=α0. For example, the acquisition target range before the change is designated in advance in the information processing apparatus 10 by a user.

The graph 21 illustrates the acquisition target range after the change for the parameter values. A center value of the acquisition target range after the change is P2, and a width of the acquisition target range is $\alpha=\alpha 0-\Delta\alpha$. By determining the timing at which the acquisition target range is narrowed and the narrowing amount $\Delta\alpha$ as described above, the processing unit 12 may appropriately determine the acquisition target range after the change. For example, the possibility that a better candidate value is included in the acquisition target range after the change may be increased. For example, a period of time to be taken by the parameter search may be shortened.

After the acquisition target range is changed, the processing unit 12 ends the parameter search when the evaluation value of each candidate value extracted from the acquisition target range after the change is not updated a certain number of times. However, after changing the acquisition target range, the processing unit 12 may further change the acquisition target range by using the timing and the narrowing amount $\Delta\alpha$ that are determined by the first to third methods described above. For example, the processing unit 12 may narrow down the acquisition target range of the value of the parameter in a step-by-step manner by changing the acquisition target range a plurality of times.

Among the evaluation values obtained for the respective candidate values, the processing unit 12 determines the candidate value corresponding to the best evaluation value as the value of the parameter to be used for the search for the solution. The processing unit 12 may execute the search for the solution by using the value of the parameter, or may cause the search unit described above to execute the search for the solution by inputting the determined value of the parameter.

As described above, according to the information processing apparatus 10, acquisition of a first candidate value from a first range that is a candidate value range of a parameter to be used for a search for a solution of a problem based on an energy function and evaluation of the first candidate value according to a result of the search in a case where the first candidate value is used as a value of the parameter are performed a plurality of times. The candidate value range is changed from the first range to a second range narrower than the first range. Acquisition of a second candidate value from the second range and evaluation of the second candidate value according to a result of the search in a case where the second candidate value is used as a value of the parameter are performed a plurality of times. Before the change to the second range, a timing at which the candidate value range is changed from the first range to the second range and a second difference ($=\Delta\alpha$) between the first range and the second range are determined based on at least one of first information and second information. The first information is a first difference between a best evaluation value among a plurality of first evaluation values calculated for a plurality of first candidate values by the evaluation in which the first candidate value is used and another evaluation value obtained by the evaluation before that of the best evaluation value. The second information is an index indicating a nature of the problem corresponding to the energy function.

Thus, the information processing apparatus 10 may improve the efficiency of the parameter search. For example, the information processing apparatus 10 may appropriately determine the second range by changing the first range to the second range by using the determined timing and second difference $\Delta\alpha$. For example, the information processing apparatus 10 may increase the possibility that a better candidate value is included in the second range. For example, the information processing apparatus 10 may shorten a period of time to be taken by the parameter search.

The information processing apparatus 10 increases the possibility that a better value is determined as the value of the parameter. For this reason, the information processing apparatus 10 may improve the solution finding performance by searching for the solution by using the determined value of the parameter. For example, the information processing apparatus 10 may increase the possibility of obtaining a relatively good solution in a short time.

Second Embodiment

Next, a second embodiment will be described.

Figure 2:
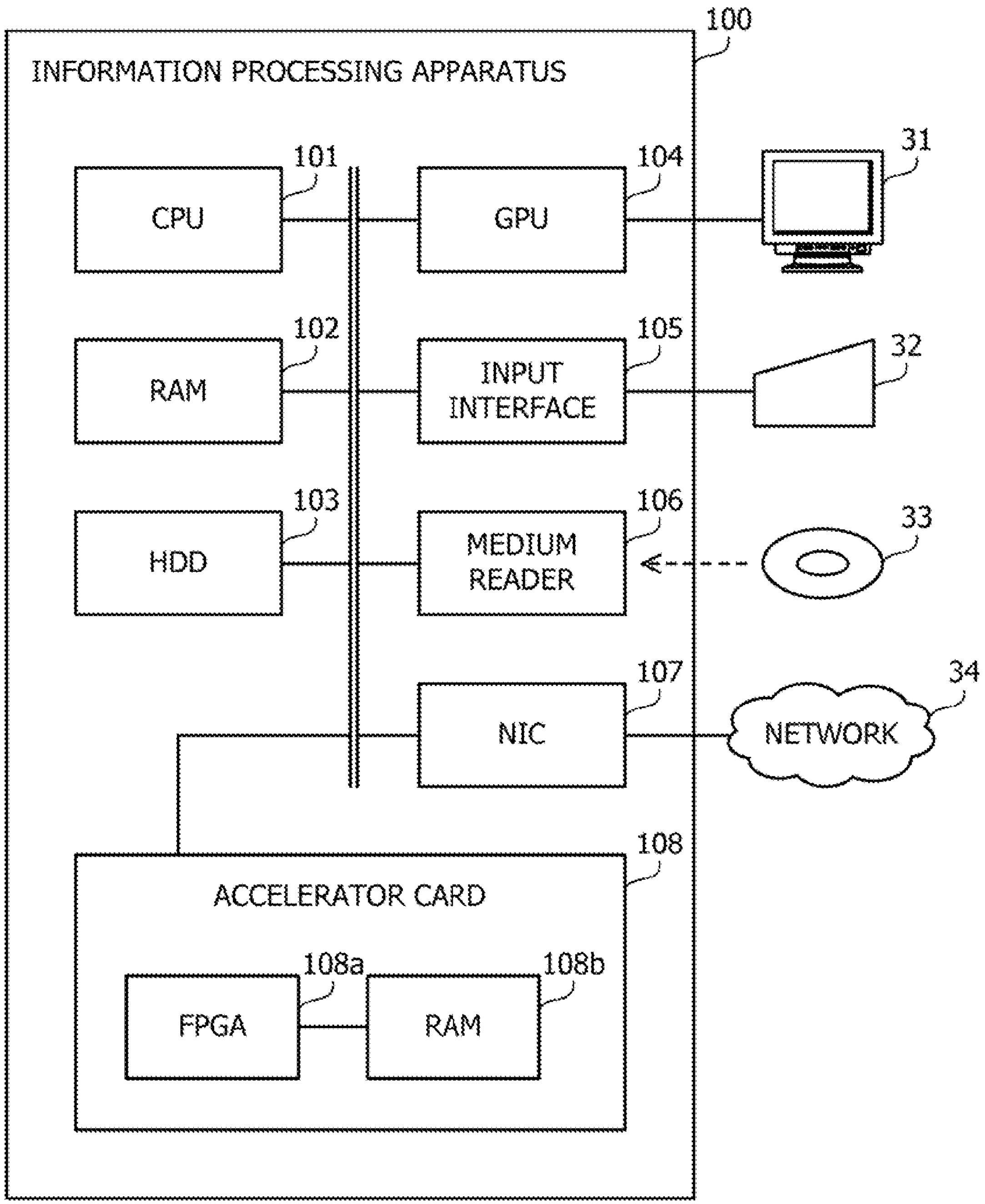
FIG. 2 is a diagram illustrating an example of hardware of an information processing apparatus according to a second embodiment.

FIG. 2 is a diagram illustrating an example of hardware of an information processing apparatus according to the second embodiment.

The information processing apparatus 100 searches for a solution to a combinatorial optimization problem by using an MCMC method, and outputs the searched solution. The combinatorial optimization problem is represented by an energy function of an Ising-type in Expression (1). Before performing an actual solution search, the information processing apparatus 100 performs a parameter search and determines a value of a parameter to be used for the solution search.

The information processing apparatus 100 includes a CPU 101, a RAM 102, a hard disk drive (HDD) 103, a GPU 104, an input interface 105, a medium reader 106, a network interface card (NIC) 107, and an accelerator card 108.

The CPU 101 is a processor that executes instructions of a program. The CPU 101 loads at least a part of the program and data stored in the HDD 103 into the RAM 102 and executes the program. The CPU 101 may include a plurality of processor cores. The information processing apparatus 100 may include a plurality of processors. Processing that will be described below may be executed in parallel by using the plurality of processors or processor cores. A set of the plurality of processors is sometimes referred to as a "multiprocessor" or merely a "processor".

The RAM 102 is a volatile semiconductor memory that temporarily stores the program executed by the CPU 101 and data used in an operation performed by the CPU 101. The information processing apparatus 100 may include a memory of a type other than the RAM and may include a plurality of memories.

The HDD 103 is a non-volatile storage device that stores data and programs of software such as an operating system (OS), middleware, and application software. The information processing apparatus 100 may include a storage device of another type such as a flash memory or a solid-state drive (SSD) or may include a plurality of non-volatile storage devices.

In accordance with an instruction from the CPU 101, the GPU 104 outputs an image to a display 31 coupled to the information processing apparatus 100. As the display 31, a freely-selected type of display such as a cathode ray tube (CRT) display, a liquid crystal display (LCD), a plasma display, and an organic electro-luminescence (OEL) display may be used.

The input interface 105 obtains an input signal from an input device 32 coupled to the information processing apparatus 100 and outputs the input signal to the CPU 101.

As the input device 32, a pointing device such as a mouse, a touch panel, a touch pad, and a trackball, a keyboard, a remote controller, a button switch, and the like may be used. A plurality of kinds of input devices may be coupled to the information processing apparatus 100.

The medium reader 106 is a reading device that reads a program and data recorded in a recording medium 33. As the recording medium 33, a magnetic disk, an optical disc, a magneto-optical (MO) disk, a semiconductor memory, and the like may be used, for example. Examples of the magnetic disk include a flexible disk (FD) and an HDD. Examples of the optical disc include a compact disc (CD) and a Digital Versatile Disc (DVD).

The medium reader 106 copies the program and the data read from the recording medium 33 to a different recording medium such as the RAM 102 and the HDD 103. The read program is executed by, for example, the CPU 101. The recording medium 33 may be a portable-type recording medium and may be used to distribute the program and the data in some cases. The recording medium 33 or the HDD 103 may be referred to as a computer-readable recording medium.

The NIC 107 is an interface that is coupled to a network 34 and that performs communication with another computer through the network 34. The NIC 107 is coupled to, for example, a communication device such as a switch or a router through a cable. The NIC 107 may be a wireless communication interface.

The accelerator card 108 is a hardware accelerator that searches for a solution to the problem represented by the energy function of the Ising-type in Expression (1), for example, the Ising problem, by using the MCMC method. By performing the MCMC method at a certain temperature or the replica-exchange method in which the states of the Ising model are exchanged among a plurality of temperatures, the accelerator card 108 may be used as a sampler that samples a state following a Boltzmann distribution at the corresponding temperature. In order to find a solution of the Ising problem, the accelerator card 108 executes annealing processing such as the replica-exchange method or the SA method in which the temperature value is gradually decreased.

The SA method is a method for efficiently finding an optimum solution by sampling a state following a Boltzmann distribution at each temperature value and gradually decreasing a temperature value to be used for the sampling from a maximum temperature value to a minimum temperature value. For example, in a case where the SA method is used, the accelerator card 108 repeats an operation of decreasing the temperature value after repeating a trial of state transition a certain number of times at a certain temperature value.

The replica-exchange method is a method in which the MCMC method is independently executed using a plurality of temperature values, and temperature values are exchanged as appropriate for states obtained at the respective temperature values. By searching in a narrow range of a state space by the MCMC method at a low temperature and searching in a wide range of the state space by the MCMC method at a high temperature, it is possible to efficiently find a good solution. For example, in a case where the replica-exchange method is used, the accelerator card 108 performs the trial of the state transition at each of the plurality of temperature values in parallel, an operation of exchanging temperature values at a predetermined exchange probability for a state obtained at each temperature value, every time a certain number of trials are performed, is repeated.

The accelerator card 108 includes an FPGA 108*a* and a RAM 108*b*. The FPGA 108*a* implements a search function in the accelerator card 108. The search function may be implemented by another type of electronic circuit such as a GPU or an ASIC. The RAM 108*b* holds data such as problem information to be used for the search in the FPGA 108*a* and a solution searched by the FPGA 108*a*. The FPGA 108*a* includes a built-in memory. According to the search processing, the FPGA 108*a* may write data stored in the built-in memory of the FPGA 108*a* into the RAM 108*b*.

A hardware accelerator that searches for a solution to a problem having an Ising form, such as the accelerator card 108, may be referred to as an Ising machine, a Boltzmann machine, or the like.

In the description below, it is assumed that the information processing apparatus 100 determines a set of a maximum temperature value and a minimum temperature value as an example by the parameter search.

Figure 3:
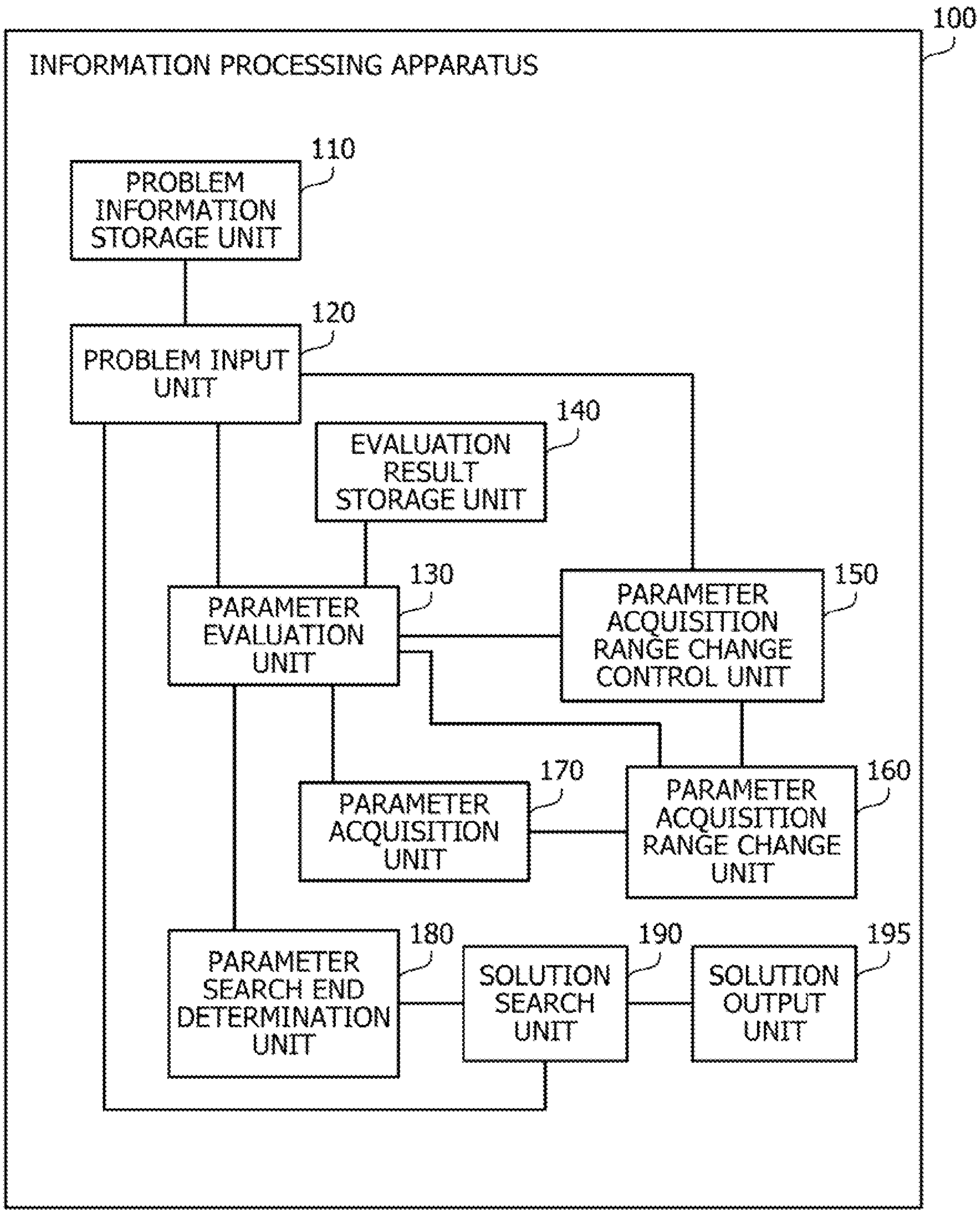
FIG. 3 is a diagram illustrating an example of functions of the information processing apparatus.

FIG. 3 is a diagram illustrating an example of the functions of the information processing apparatus.

The information processing apparatus 100 includes a problem information storage unit 110, a problem input unit 120, a parameter evaluation unit 130, an evaluation result storage unit 140, a parameter acquisition range change control unit 150, a parameter acquisition range change unit 160, a parameter acquisition unit 170, a parameter search end determination unit 180, a solution search unit 190, and a solution output unit 195.

A storage area of the RAM 102 or the HDD 103 is used for the problem information storage unit 110 and the evaluation result storage unit 140. The problem input unit 120, the parameter evaluation unit 130, the parameter acquisition range change control unit 150, the parameter acquisition range change unit 160, the parameter acquisition unit 170, the parameter search end determination unit 180, and the solution output unit 195 are implemented by the CPU 101 executing a program stored in the RAM 102. The solution search unit 190 is implemented by the accelerator card 108.

The problem information storage unit 110 stores problem information indicating an Ising problem. The problem information includes information indicating an energy function. For example, the problem information includes weight coefficients and biases included in the energy function. The problem information includes information indicating the number of bits, the type of a constraint, and the number of constraints that are included in the energy function. The problem information may include an initial state of the Ising model, an initial energy, a decrease range of a temperature value in the SA method, and the like. The problem information may include a difference between adjacent temperature values in the replica-exchange method. The problem information is input to the information processing apparatus 100 by a user and stored in the problem information storage unit 110.

The problem input unit 120 inputs the problem information stored in the problem information storage unit 110 to the parameter evaluation unit 130 and the solution search unit 190. The problem input unit 120 inputs information indicating the number of bits, the type of a constraint, and the number of constraints that are included in the energy function to the parameter acquisition range change control unit 150. Based on the problem information stored in the problem information storage unit 110, the problem input unit 120 acquires the number of bits included in the energy function of Expression (1), and the type of a constraint and the number of constraints that are included in the energy function based on Expression (3) and Expression (4).

The parameter evaluation unit 130 acquires a candidate value of a parameter from the parameter acquisition unit 170. The candidate value of the parameter is extracted from values belonging to a certain acquisition target range. As described above, in this example, the parameter is a maximum temperature value and a minimum temperature value. An acquisition target range is determined for each of the maximum temperature value and the minimum temperature value. For this reason, the "candidate value" in the following description may also be referred to as a set of candidate values or a candidate value set.

The parameter evaluation unit 130 outputs the candidate value to the parameter search end determination unit 180, and causes the solution search unit 190 to execute solution search for a certain period of time. The parameter evaluation unit 130 evaluates the candidate value according to a result of the solution search for the certain period of time by the solution search unit 190. As an energy obtained by executing the solution search such as the SA method by the solution search unit 190 for the certain period of time is lower and a period of time until reaching the energy is shorter, the parameter evaluation unit 130 highly evaluates the corresponding candidate value. The parameter evaluation unit 130 calculates an evaluation value indicating an evaluation result for the candidate value.

For example, the parameter evaluation unit 130 calculates an evaluation value for the corresponding candidate value by using the following evaluation expression. As an example, it is assumed that a larger evaluation value indicates a higher evaluation.

For example, the parameter evaluation unit 130 sets an evaluation value to be equal to $E*p+t*q$. E is a minimum energy of the solution reached in a case where the solution search is performed with the value of the parameter set to the corresponding candidate value. t is a period of time taken to reach the solution having the minimum energy. p and q are coefficients indicating weights of an energy and a period of time for the evaluation value, respectively. Both of p and q are real numbers equal to or smaller than 0.

Alternatively, the parameter evaluation unit 130 may set the evaluation value to be equal to $1/(E*p+t*q)$. In this case, both of p and q are real numbers larger than or equal to 0. Note that $p+q>0$ is satisfied. For example, there is no case where $p=0$ and $q=0$ are satisfied at the same time.

The parameter evaluation unit 130 stores the evaluated candidate value and the evaluation value in the evaluation result storage unit 140. The parameter evaluation unit 130 outputs the evaluation value to the parameter acquisition range change control unit 150 and the parameter search end determination unit 180. The parameter evaluation unit 130 outputs the candidate value corresponding to the current best evaluation value to the parameter acquisition range change unit 160.

The evaluation result storage unit 140 stores an evaluation result obtained by the parameter evaluation unit 130. The evaluation result includes the candidate value and the evaluation value.

Based on an index indicating the nature of the Ising problem and the evaluation value of each candidate value, the parameter acquisition range change control unit 150 determines a timing at which an acquisition target range of the candidate value of the parameter is narrowed and an amount by which the acquisition target range is narrowed. The index indicating the nature of the Ising problem indicates the difficulty level of the Ising problem, and is, for example, an index corresponding to the number of bits of the Ising problem, the type of a constraint, and the number of constraints. The parameter acquisition range change control unit 150 outputs the timing at which the acquisition target range is narrowed and the amount by which the acquisition target range is narrowed to the parameter acquisition range change unit 160.

Based on the candidate value corresponding to the current best evaluation value, and the input timing at which the acquisition target range is narrowed and the input amount by which the acquisition target range is narrowed, the parameter acquisition range change unit 160 instructs the parameter acquisition unit 170 to change the acquisition target range of the candidate value.

From the current acquisition target range of the candidate value of the parameter, the parameter acquisition unit 170 acquires a candidate value to be evaluated next, and outputs the candidate value to the parameter evaluation unit 130. For example, the parameter acquisition unit 170 may acquire candidate values in a round-robin manner as in a grid search or may randomly acquire candidate values as in a random search. The acquisition target range at the start of the parameter search is designated in advance by a user.

According to the instruction from the parameter acquisition range change unit 160, the parameter acquisition unit 170 changes the acquisition target range of the candidate value of the parameter. The acquisition target range after the change is narrower than the immediately preceding acquisition target range. A center value of the acquisition target range after the change is the candidate value corresponding to the best evaluation value in the immediately preceding acquisition target range. When a plurality of parameters are present, the parameter acquisition unit 170 changes an acquisition target range of a candidate value for each parameter.

The parameter search end determination unit 180 determines the end of the parameter search. For example, the parameter search end determination unit 180 causes the solution search unit 190 to execute the solution search for a certain period of time by using the candidate value of the parameter input from the parameter evaluation unit 130. In a case where the evaluation value for each candidate value does not change a certain number of times, the parameter search end determination unit 180 ends the parameter search using the solution search unit 190. Thus, the parameter search end determination unit 180 acquires the value of the parameter corresponding to the best evaluation value obtained in the parameter search from the parameter evaluation unit 130, inputs the value of the parameter to the solution search unit 190, and causes the solution search unit to execute an actual solution search.

By using the candidate value of the parameter input from the parameter search end determination unit 180, the solution search unit 190 performs a solution search by the SA method. The solution search unit 190 outputs a result of the solution search in the parameter search to the parameter evaluation unit 130. An association line between the parameter evaluation unit 130 and the solution search unit 190 is omitted in FIG. 3. The result of the solution search includes an energy obtained by the solution search. The solution search unit 190 executes the actual solution search by using the value of the parameter determined by the parameter search, and outputs the solution finally obtained by the solution search to the solution output unit 195. A longer period of time is used for the actual solution search than that for the solution search for evaluation of the candidate value.

The solution output unit 195 outputs the solution of the Ising problem obtained by the solution search unit 190. For example, the solution output unit 195 causes the display 31 to display information indicating the solution. The solution output unit 195 may transmit the information indicating the solution to another information processing apparatus through the network 34.

FIG. 4 is a diagram illustrating an example of a parameter evaluation table.

A parameter evaluation table 141 is stored in the evaluation result storage unit 140. The parameter evaluation table 141 holds evaluation values obtained by the parameter evaluation unit 130 for candidate values of parameters. The parameter evaluation table 141 includes items of an item number, a maximum temperature value, a minimum temperature value, and an evaluation value.

A number for identifying a record is registered in the item of the item number. The item number indicates the number of times the evaluation for the corresponding parameter, for example, the parameter evaluation is performed. One record in the parameter evaluation table 141 corresponds to a result of parameter evaluation for one time. A candidate value of the maximum temperature value that is one of the parameters is registered in the item of the maximum temperature value. A candidate value of the minimum temperature value that is one of the parameters is registered in the item of the minimum temperature value. An evaluation value for a pair of the candidate value of the maximum temperature value and the candidate value of the minimum temperature value is registered in the item of the evaluation value.

For example, the parameter evaluation table 141 includes a record having an item number "1", a maximum temperature value "Tmax1", a minimum temperature value "Tmin1", and an evaluation value "V11". The record indicates that a set (Tmax1, Tmin1) of the candidate values (the maximum temperature value, the minimum temperature value) is evaluated in the first evaluation in the parameter search, and the evaluation value is "V11".

Records of evaluation values for other parameter sets are also registered in the parameter evaluation table 141.

Figure 5:
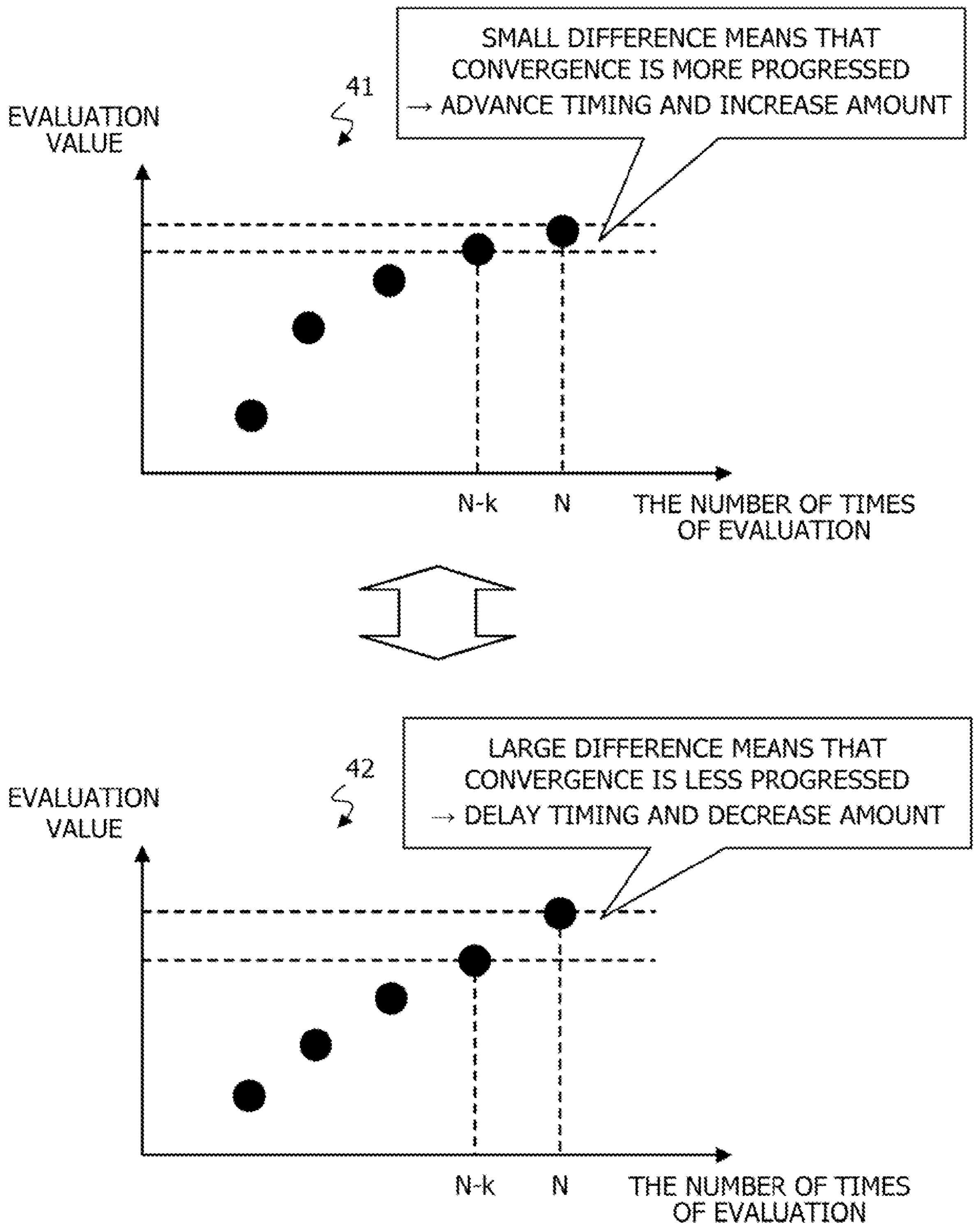
FIG. 5 is a diagram illustrating a control example of an acquisition target range of a candidate value of a parameter.

FIG. 5 is a diagram illustrating a control example of an acquisition target range of a candidate value of a parameter.

Based on the parameter evaluation table 141, the parameter acquisition range change control unit 150 determines a timing at which an acquisition target range of a candidate value of a parameter is narrowed and an amount by which the acquisition target range is narrowed. For example, the parameter acquisition range change control unit 150 obtains a best evaluation value $V_n$ obtained in N times of evaluation for a certain acquisition target range. The parameter acquisition range change control unit 150 obtains an evaluation value $V_{n-k}$ obtained by the evaluation before the number of times k from the number of times n when the best evaluation value is obtained. k is an integer being equal to or larger than one. $V_n$ and $V_{n-k}$ are evaluation values for each of the candidate values acquired from the same acquisition target range. Based on $V_n$ and $V_{n-k}$, the parameter acquisition range change control unit 150 determines a timing at which the acquisition target range is narrowed and an amount by which the acquisition target range is narrowed. Values of N and k are input to the information processing apparatus 100 by a user in advance.

Each of graphs 41 and 42 exemplifies a case where the best evaluation value $V_n$ obtained by N times of evaluation satisfies $V_n=V_N$. Horizontal axes of both of graphs 41 and 42 indicate the number of evaluations. Vertical axes of both of the graphs 41 and 42 indicate evaluation values.

The graph 41 illustrates a case where a difference $V_n-V_{n-k}=V_N-V_{N-k}$ is relatively small. As the difference $V_n-V_{n-k}=V_N-V_{N-k}$ is smaller, it is estimated that the convergence of the evaluation value for the candidate value of the parameter is more progressed. As the difference is smaller, the parameter acquisition range change control unit 150 advances the timing at which the acquisition target range is narrowed, and increases the amount by which the acquisition target range is narrowed.

The graph 42 illustrates a case where the difference $V_n-V_{n-k}=V_N-V_{N-k}$ is relatively large. As the difference $V_n-V_{n-k}=V_N-V_{N-k}$ is larger, it is estimated that the convergence of the evaluation value for the candidate value of the parameter has not progressed. As the difference is larger, the parameter acquisition range change control unit 150 delays the timing at which the acquisition target range is narrowed and decreases the amount by which the acquisition target range is narrowed.

For example, the parameter acquisition range change control unit 150 uses Expressions (5) and (6) to calculate a timing at which the acquisition target range is narrowed and an amount $\Delta\alpha$ by which the acquisition target range is narrowed. The timing is represented by a period of time τ1 from a time point at which N times of evaluation are completed. τ1 may be represented by the number of times of parameter evaluation performed after the time point.

$$T1 = g*(V_n - V_{n-k}) + c(5)$$

$$\Delta a = g/(V_n - V_{n-k}) + c(6)$$

Both g and c are positive real numbers. g in Expressions (5) and (6) may be different values from each other. c in Expressions (5) and (6) may be different values from each other.

The parameter acquisition range change control unit 150 may further determine τ1 and $\Delta\alpha$ based on an index indicating a nature of an Ising problem corresponding to an energy function. The index indicating the nature of the Ising problem includes the number of bits A in the energy function of Expression (1), the type of a constraint, and the number of constraints of each type. Examples of the type of a constraint include the 1w1h constraint and the 2w1h constraint described above. For example, the parameter acquisition range change control unit 150 may calculate τ1 and $\Delta\alpha$ by using Expressions (7) and (8). It is assumed that the energy function includes two types of constraints. The number of constraints of a first type is B1. The number of constraints of a second type is B2.

$$T1 = a*A + b1*B1 + b2*B2 + g*(V_n - V_{n-k}) + c(7)$$

$$\Delta a = a/A + b3/B1 + b4/B2 + g/(V_n - V_{n-k}) + c(8)$$

All of a, b1, and b2 are positive real numbers. a in Expressions (7) and (8) may be different values from each other. g in Expressions (7) and (8) may be different values from each other. c in Expressions (7) and (8) may be different values from each other. b1 and b2 in Expression (7) is a coefficient corresponding to the type of a constraint. As the type of a constraint is more complex, the values of b1 and b2 are made larger. b1 and b2 in Expression (8) is a coefficient corresponding to the type of a constraint. As the type of a constraint is more complex, the values of b3 and b4 are made smaller. An energy function may include one type of constraint or may include three or more types of constraints.

The parameter acquisition range change control unit 150 may calculate τ1 and Δα by using Expressions (9) and (10):

$$\tau 1 = a * A * B1 * B2 * (V_n - V_{n-k}) + c \quad (9)$$

$$\Delta\alpha = a / \{A * B1 * B2 * (V_n - V_{n-k})\} + c \quad (10)$$

where "a" in Expressions (9) and (10) may be different values from each other; "c" in Expressions (9) and (10) may be different values from each other.

In a case where a plurality of parameters are present, the parameter acquisition range change control unit 150 may calculate Δα for each parameter. As a coefficient such as a, b1, or b2 to be used for calculation of Δα, the parameter acquisition range change control unit 150 may use a coefficient corresponding to the corresponding parameter. Expressions (5) to (10) are an example, and the information processing apparatus 100 may obtain τ1 or Δα by using another expression.

The information processing apparatus 100 may hold a table indicating a pattern such as τ1=t and Δα=u when the number of bits in the Ising problem is equal to or less than d, the number of the first type of constraints is equal to or less than e1, the number of the second type of constraints is equal to or less than e2, and $V_n - V_{n-k}$ is equal to or less than f. In this case, the table is stored in advance in the storage unit implemented by the RAM 102 or the HDD 103 included in the information processing apparatus 100. The parameter acquisition range change control unit 150 may determine τ1 and Δα with reference to the table by adopting a pattern that satisfies conditions.

Next, a procedure of processing of the information processing apparatus 100 will be described.

Figure 6:
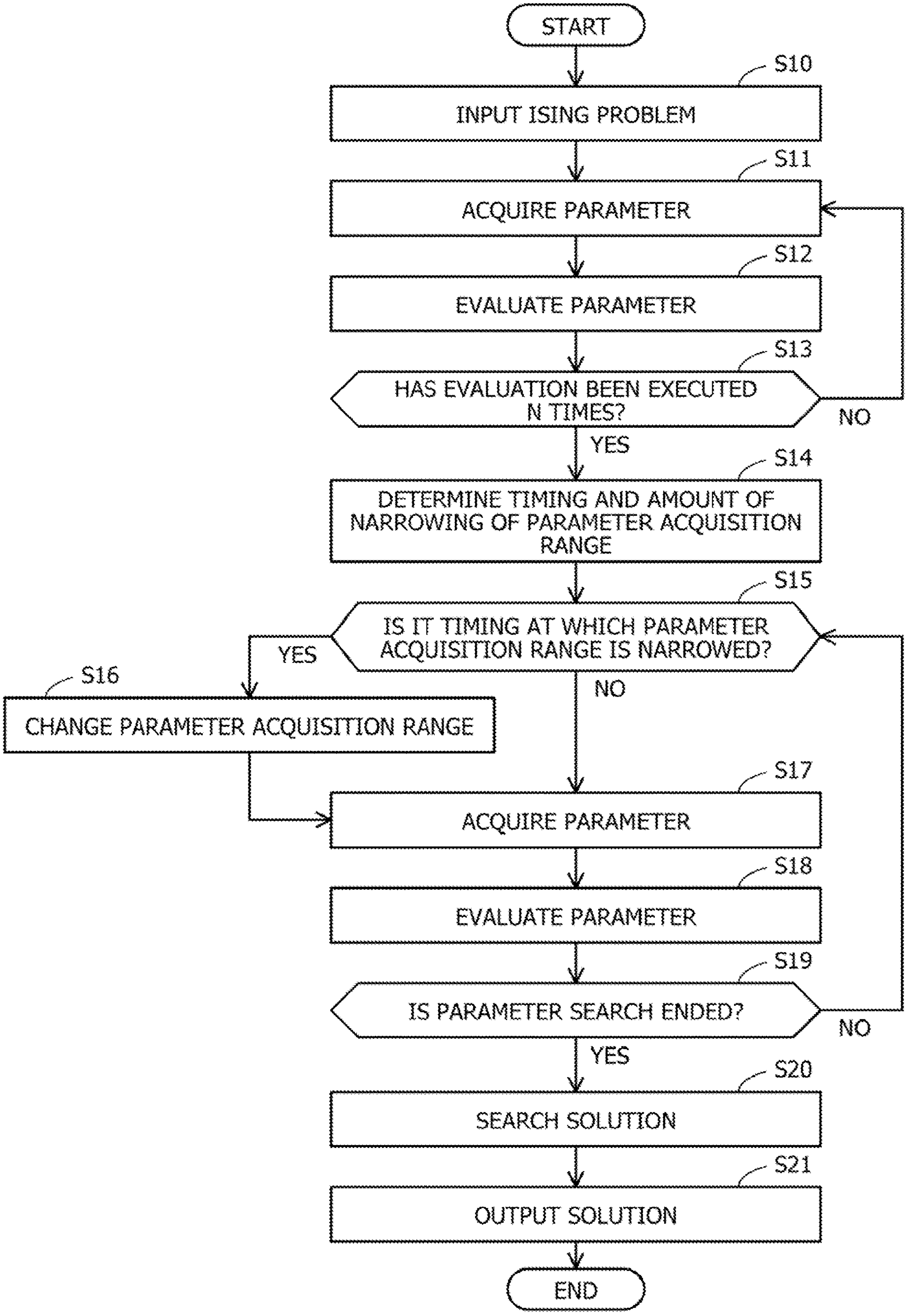
FIG. 6 is a flowchart illustrating an example of processing of the information processing apparatus.

FIG. 6 is a flowchart illustrating an example of processing of the information processing apparatus.

(S10) The problem input unit 120 inputs information of an Ising problem stored in the problem information storage unit 110 to the parameter evaluation unit 130, the parameter acquisition range change control unit 150, and the solution search unit 190.

(S11) The parameter acquisition unit 170 acquires a candidate value of a parameter from a certain acquisition target range, and outputs the candidate value to the parameter evaluation unit 130. An initial acquisition target range is input to the information processing apparatus 100 in advance. When a plurality of parameters are present, the acquisition target range is determined for each parameter. For example, in a case where a maximum temperature value and a minimum temperature value are present as the parameters, the parameter acquisition unit 170 acquires a candidate value of the maximum temperature value from an acquisition target range of the maximum temperature value, and acquires a candidate value of the minimum temperature value from an acquisition target range of the minimum temperature value. The parameter acquisition unit 170 outputs the acquired pair of the candidate value of the maximum temperature value and the candidate value of the minimum temperature value to the parameter evaluation unit 130.

(S12) The parameter evaluation unit 130 evaluates the candidate value of the parameter. For example, the parameter evaluation unit 130 supplies the candidate value of the parameter to the solution search unit 190 via the parameter search end determination unit 180, and causes the solution search unit to execute the solution search for a certain period of time by using the candidate value. Based on a reached minimum energy and a period of time until reaching the minimum energy that are obtained as a result of the solution search for the certain period of time by the solution search unit 190, the parameter evaluation unit 130 calculates an evaluation value for the candidate value of the parameter. The parameter evaluation unit 130 stores the candidate value and the evaluation value of the parameter in the parameter evaluation table 141.

(S13) The parameter acquisition range change control unit 150 determines whether or not the parameter evaluation in step S12 is executed N times. In a case where the parameter evaluation has not been executed N times, the parameter acquisition range change control unit 150 advances the processing to step S11. In a case where the parameter evaluation has been executed N times, the parameter acquisition range change control unit 150 advances the processing to step S14.

(S14) The parameter acquisition range change control unit 150 determines a timing at which a parameter acquisition range, for example, the acquisition target range of the candidate value of the parameter is narrowed and an amount Δα by which the acquisition target range is narrowed. For example, one of Expressions (5), (7), and (9) is used to calculate the timing. For example, one of Expressions (6), (8), and (10) is used to calculate Δα. When a plurality of parameters are present, the parameter acquisition range change control unit 150 determines Δα for each parameter. The parameter acquisition range change control unit 150 outputs τ1 indicating the determined timing and Δα to the parameter acquisition range change unit 160.

(S15) The parameter acquisition range change unit 160 determines whether or not the current time point is the timing at which the acquisition target range of the parameter is narrowed. When the current time point is not the timing, the parameter acquisition range change unit 160 causes the processing to proceed to step S17. When the current time point is the timing, the parameter acquisition range change unit 160 causes the processing to proceed to step S16.

For example, in a case where an elapsed time from immediately after step S14 reaches τ1, the parameter acquisition range change unit 160 determines that the current time point is the timing at which the acquisition target range of the parameter is narrowed. Alternatively, in a case where the number of times of the parameter evaluation reaches τ1 from the time point of step S14, the parameter acquisition range change unit 160 may determine that the current time point is the timing at which the parameter acquisition target range is narrowed.

(S16) The parameter acquisition range change unit 160 acquires a candidate value of the parameter corresponding to a best evaluation value at the current time point from the parameter evaluation unit 130. The parameter acquisition range change unit 160 determines the acquired candidate value as a center value of a new acquisition target range. The parameter acquisition range change unit 160 determines a range obtained by narrowing the width of the acquisition target range by Δα with the center value serving as a center, as the new acquisition target range of the candidate value of the parameter. For example, in a case where the center value is Pc, and the width of the original acquisition target range is α0, the new acquisition target range is Pc±{(α0−Δα)/2}. In a case where a plurality of parameters are present, the parameter acquisition range change unit 160 determines a new acquisition target range for each parameter. The parameter acquisition range change unit 160 causes the processing to proceed to step S17.

(S17) The parameter acquisition unit 170 acquires a candidate value of the parameter from the current acquisition target range, and outputs the candidate value to the parameter evaluation unit 130. At this time, the parameter acquisition unit 170 acquires, for example, a candidate value that has not been acquired so far from the current acquisition target range.

(S18) The parameter evaluation unit 130 evaluates the candidate value of the parameter. The evaluation method is similar to that in step S12. A parameter evaluation unit 130 outputs an evaluation value for the corresponding candidate value to the parameter search end determination unit 180. The parameter evaluation unit 130 stores the candidate value and the evaluation value of the parameter in the parameter evaluation table 141.

(S19) The parameter search end determination unit 180 determines whether or not the parameter search is to be ended. When the parameter search is not to be ended, the parameter search end determination unit 180 causes the processing to proceed to step S15. When the parameter search is to be ended, the parameter search end determination unit 180 causes the processing to proceed to step S20. For example, in a case where the evaluation value for each candidate value does not change a certain number of times, the parameter search end determination unit 180 determines that the parameter search is to be ended.

(S20) The parameter evaluation unit 130 inputs the value of the parameter corresponding to the best evaluation value obtained up to the current time point to the solution search unit 190 via the parameter search end determination unit 180 based on the parameter evaluation table 141, and causes the solution search unit to execute an actual solution search. The solution search unit 190 executes the solution search by using the value of the parameter corresponding to the best evaluation value.

(S21) When the solution search by the solution search unit 190 is ended, the solution output unit 195 acquires a solution finally obtained by the solution search from the solution search unit 190, and outputs the solution.

The example has been described in which the information processing apparatus 100 changes the acquisition target range of the candidate value of the parameter only once in the procedure illustrated in FIG. 6. Alternatively, the information processing apparatus 100 may change the acquisition target range a plurality of times. For example, the parameter acquisition range change unit 160 may execute step S16 at a cycle $\tau 1$ to narrow the acquisition target range by Δα at a time, thereby narrowing the acquisition target range in a step-by-step manner.

Alternatively, when the number of times of the parameter evaluation using the acquisition target range after the change reaches N' times, the parameter acquisition range change unit 160 may further determine a timing at which the current acquisition target range is narrowed and a narrowing amount based on a result of the N' times of the parameter evaluation and the nature of the problem. Based on the determined timing and amount, the parameter acquisition range change unit 160 may perform a change of further narrowing the current acquisition target range. As described above, the parameter acquisition range change unit 160 may narrow down the acquisition target range of the candidate value of the parameter in a step-by-step manner.

FIG. 6 illustrates the example in which, after the parameter evaluation is performed N times, the timing at which the acquisition target range is narrowed and the narrowing amount are determined. Alternatively, the parameter acquisition range change control unit 150 may determine the timing or the narrowing amount Δα by using only the index indicating the nature of the problem. Alternatively, the timing may be represented by a period of time $\tau 2$ from a start time point of the parameter search. $\tau 2$ may be represented by the number of times of the parameter evaluation to be performed after the start time point.

$$T2 = a*A + b1*B1 + b2*B2 + c \tag{11}$$

$$\Delta a = a/A + b3/B1 + b4/B2 + c \tag{12}$$

where "a" in Expressions (11) and (12) may be different values from each other; "c" in Expressions (11) and (12) may be different values from each other. In Expression (11), as the type of a constraint is more complex, the values of b1 and b2 are made larger. In Expression (12), as the type of a constraint is more complex, the values of b3 and b4 are made smaller.

The parameter acquisition range change control unit 150 may calculate $\tau 2$ and Δα by using Expressions (13) and (14):

$$T2 = a*A*B1*B2 + c \tag{13}$$

$$\Delta a = a/\{A*B1*B2\} + c \tag{14}$$

where "a" in Expressions (13) and (14) may be different values from each other; "c" in Expressions (13) and (14) may be different values from each other. Expressions (11) to (14) are an example, and the information processing apparatus 100 may obtain $\tau 2$ or Δα by using another expression.

In a case where the number of bits of the Ising problem is equal to or less than d, the number of the first type of constraints is equal to or less than e1, and the number of the second type of constraints is equal to or less than e2, the information processing apparatus 100 may hold a table indicating a pattern such as $\tau 2$=t and Δα=u. The parameter acquisition range change control unit 150 may determine $\tau 2$ and Δα by adopting a pattern that satisfies conditions with reference to the table.

In a case where the information processing apparatus 100 determines a timing at which the acquisition target range is narrowed and a narrowing amount Δα by using only the index indicating the nature of the problem, the information processing apparatus 100 may execute the following procedure instead of the procedure in FIG. 6.

Figure 7:
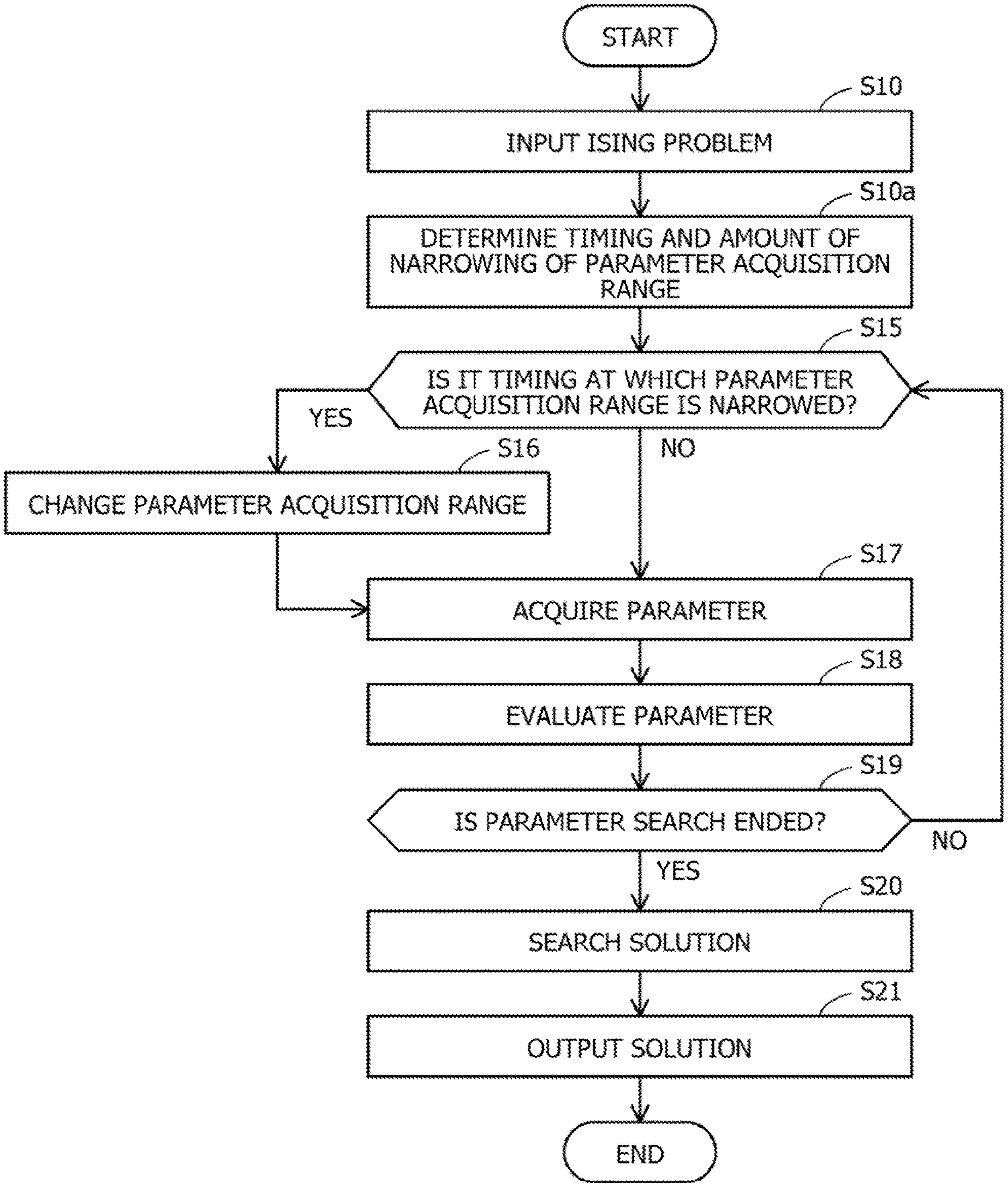
FIG. 7 is a flowchart illustrating another example of processing of the information processing apparatus.

FIG. 7 is a flowchart illustrating another example of processing of the information processing apparatus.

A difference from the procedure in FIG. 6 is that, in the procedure in FIG. 7, step S10*a* is executed immediately after step S10, and the processing proceeds to step S15 after step S10*a*. For this reason, step S10*a* will be described below, and description of the other procedures will be omitted.

(S10*a*) The parameter acquisition range change control unit 150 determines a timing at which a parameter acquisition range, for example, an acquisition target range of a candidate value of a parameter is narrowed and an amount $\Delta\alpha$ by which the acquisition target range is narrowed. For example, one of Expressions (11) and (13) is used to calculate the timing. For example, one of Expressions (12) and (14) is used to calculate $\Delta\alpha$. When a plurality of parameters are present, the parameter acquisition range change control unit 150 determines $\Delta\alpha$ for each parameter. The parameter acquisition range change control unit 150 outputs $\tau 2$ indicating the determined timing and $\Delta\alpha$ to the parameter acquisition range change unit 160. A certain acquisition target range to be initially used is input to the information processing apparatus 100 in advance.

In step S15, for example, when a time point immediately after step S10*a*, for example, an elapsed time from a start time point of the parameter search reaches $\tau 2$, the parameter acquisition range change unit 160 determines that the current time point is the timing at which the acquisition target range of the parameter is narrowed. Alternatively, in a case where the number of times of the parameter evaluation reaches $\tau 2$ from the start time point, the parameter acquisition range change unit 160 may determine that the current time point is the timing at which the acquisition target range of the parameter is narrowed.

As described above, the information processing apparatus 100 may efficiently narrow down the acquisition target range of the candidate value of the parameter.

The example in which the information processing apparatus 100 changes the acquisition target range of the candidate value of the parameter only once in the procedure illustrated in FIG. 7 has been described. Alternatively, the information processing apparatus 100 may change the acquisition target range a plurality of times. For example, the parameter acquisition range change unit 160 may execute step S16 at a cycle $\tau 2$ to narrow the acquisition target range by $\Delta\alpha$ at a time, thereby narrowing down the acquisition target range in a step-by-step manner.

According to the procedure illustrated in FIG. 6, the parameter acquisition range change control unit 150 may determine $\tau 2$ indicating the narrowing timing and the amount $\Delta\alpha$ to perform the parameter search. For example, $\tau 2$ described above may be determined as a period of time from immediately after step S14 of the procedure in FIG. 6.

Figure 8A:
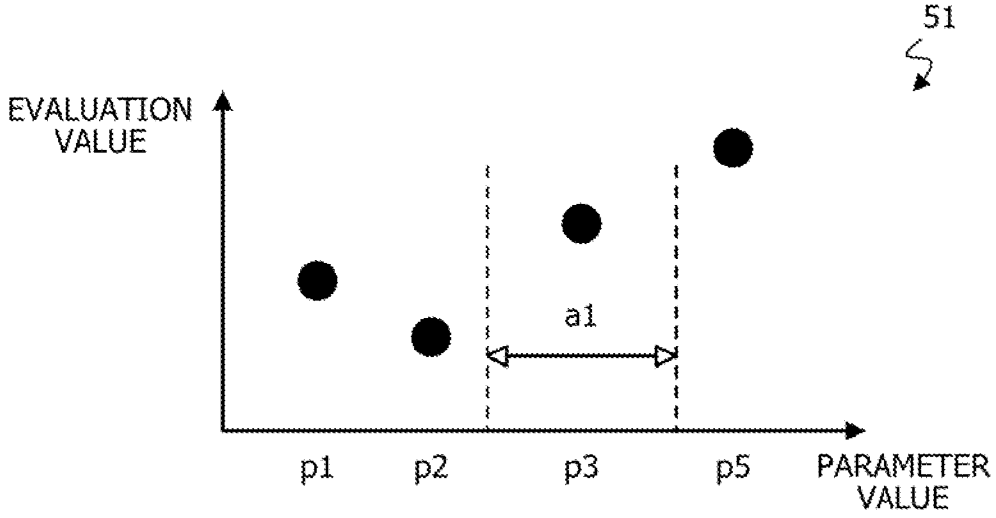
FIGS. 8A and 8B are diagrams illustrating an example of an acquisition target range of a candidate value of a parameter.
Figure 8B:
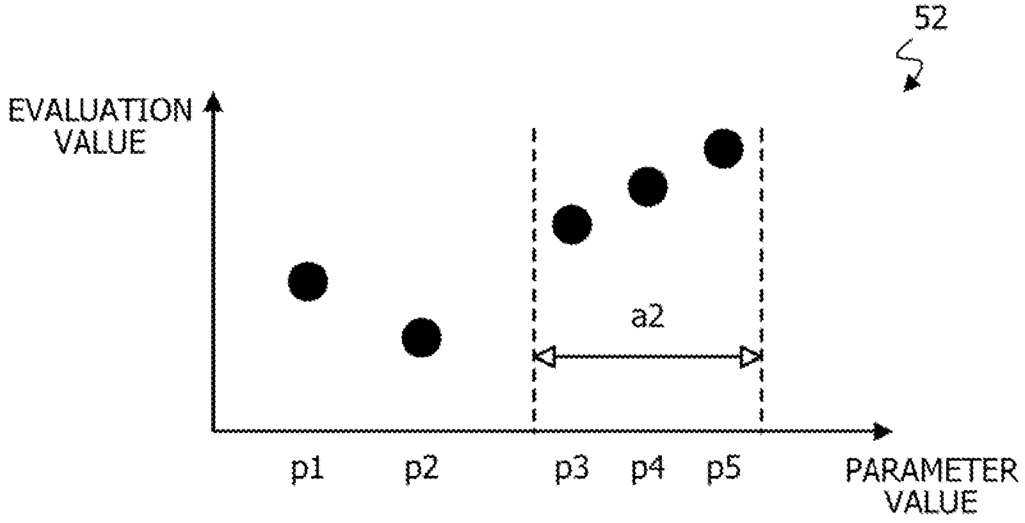

FIGS. 8A and 8B are diagrams illustrating an example of an acquisition target range of a candidate value of a parameter.

FIG. 8A illustrates a graph 51 indicating an inappropriate acquisition target range as an example. FIG. 8B illustrates a graph 52 indicating an appropriate acquisition target range as an example. A horizontal axis of each of the graphs 51 and 52 indicates a candidate value of a parameter, for example, a parameter value. A vertical axis of each of the graphs 51 and 52 indicates an evaluation value. A parameter value with a best evaluation, for example, a best parameter value is assumed to be p5. The graph 51 illustrates an acquisition target range of a width $\alpha 1$ having a parameter value p3 as a center value. The graph 52 illustrates an acquisition target range of a width $\alpha 2$ having a parameter value p4 as a center value.

For example, a method for narrowing the acquisition target range by giving both a timing at which the acquisition target range is narrowed and a narrowing amount as fixed values is also conceivable. However, in this case, as illustrated in the graph 51, there is a possibility that the best parameter value p5 is excluded from the acquisition target range.

Thus, the information processing apparatus 100 uses at least one of the degree of convergence of an evaluation value in the parameter search and the index indicating the nature of the problem to determine the timing at which the acquisition target range is narrowed and the narrowing amount. This enables the information processing apparatus 100 to easily find the parameter value p4 better than the parameter value p3, and to determine an acquisition target range with the appropriate width $\alpha 2$ having the parameter value p4 as a center value. As a result, the information processing apparatus 100 may reduce the possibility that the best parameter value p5 is excluded from the acquisition target range. The information processing apparatus 100 may suppress a period of time to be taken by the parameter search in a case where the degree of convergence of the evaluation value is high or in a case where the problem has a relatively low difficulty level due to the nature of the problem.

The information processing apparatus 100 may appropriately determine the value of the parameter to be used for the solution search, and thus, the solution finding performance in an actual solution search by the solution search unit 190 may be improved. For example, it is possible to increase the possibility that the information processing apparatus 100 may reduce the time to be taken by the parameter search while avoiding deterioration in the solution finding performance due to overlooking of the best parameter value.

A method of tree-structured Parzen estimator (TPE) may also be used for the parameter search. TPE is a method for acquiring a parameter value estimated to obtain higher evaluation from the evaluation of the parameter value already acquired. However, even when TPE is used, many parameter values are to be evaluated until accurate estimation is performed, and thus, it takes a long time to converge to the best parameter value. On the other hand, as compared with the method of TPE, the information processing apparatus 100 may increase the possibility of convergence to the best parameter value in a relatively short time.

An experiment for five real problems was conducted. Among the five real problems, three problems have a relatively small number of bits (477 to 755 bits), and the number of constraints is about 159 to 250. On the other hand, for the remaining two problems, one problem has 5079 bits, and the other problem has 6321 bits, and the numbers of constraints are 1693 and 2107, respectively.

For the five real problems, another information processing apparatus was used to simply acquire and evaluate a parameter 300 times, and then, a solution was obtained by using the value of the parameter searched by narrowing down an acquisition target range of a candidate value of the parameter to ¼. By contrast, after the parameter acquisition and evaluation were performed 200 times by a function of the information processing apparatus 100 in three problems in which the number of bits was relatively small, a solution was obtained by using the value of the parameter searched by narrowing down the acquisition target range. By comparing both solution finding results, the following result was obtained.

For three problems with a relatively small number of bits, it has been confirmed that, when the information processing apparatus 100 narrows down the acquisition target range after 200 times, the solution finding speed is improved while the solution finding performance at the same level is maintained. For example, for three problems with a relatively small number of bits, the energies obtained by finding solutions in another information processing apparatus were each (19222, 14670, 25362), and the periods of time taken to reach the energies were each (18 hours, 29 hours, 29 hours). On the other hand, for the three problems, the energies obtained by finding solutions by the information processing apparatus 100 were each (19215, 14686, 25362), and the periods of time taken to reach the energies were each (21 hours, 25 hours, 18 hours). Thus, in this case, the speed improvement of 19% on average was obtained while the solution finding performance of the difference among the energies of 0.024% on average was maintained.

As described above, the information processing apparatus 100 executes the following processing.

The problem information storage unit 110 stores information indicating an energy function of an Ising model corresponding to a problem. The information processing apparatus 100 acquires a first candidate value from a first range that is a candidate value range of a parameter to be used for a search for a solution of the problem based on the energy function, and evaluates the first candidate value according to a result of the search for the solution in a case where the first candidate value is used as a value of the parameter, a plurality of times. The information processing apparatus 100 changes the candidate value range from the first range to a second range narrower than the first range. The information processing apparatus 100 acquires a second candidate value from the second range and evaluates the second candidate value according to a result of a search for a solution in a case where the second candidate value is used as a value of the parameter, a plurality of times. Before the change to the second range, the information processing apparatus 100 determines a timing at which the candidate value range is changed from the first range to the second range and a second difference between the first range and the second range, based on at least one of a first difference between a best evaluation value among a plurality of first evaluation values calculated for a plurality of first candidate values by the evaluation in which the first candidate value is used and another evaluation value obtained by the evaluation before the evaluation of the best evaluation value, and an index indicating a nature of the problem corresponding to the energy function.

Thus, the information processing apparatus 100 may improve the efficiency of the parameter search. A period during which the plurality of first evaluation values are obtained may be determined in advance based on the number of times of evaluation for candidate values of the parameter. The number of parameters may be one or plural. Examples of a parameter to be subjected to a parameter search include a maximum temperature value and a minimum temperature value in an SA method and a replica-exchange method. Examples of a parameter to be subjected to the parameter search may include another parameter such as a decrease range of a temperature value in the SA method or a difference between adjacent temperature values in the replica-exchange method. As a parameter corresponding to a difference between adjacent temperature values in the replica-exchange method, the number of replicas may be used. A search for a solution is executed by a search unit such as the accelerator card 108, for example. However, the search for the solution may be executed by the CPU 101.

For example, as the first difference increases, the information processing apparatus 100 may delay the timing of changing from the first range to the second range and reduce the second difference. Thus, the information processing apparatus 100 may increase the possibility of finding a better value of the parameter. In a case where it is determined that the convergence of the evaluation value is relatively advanced, the information processing apparatus 100 may efficiently reduce a period of time for the parameter search.

In a case where the first difference is equal to or smaller than a threshold value, the information processing apparatus 100 may set the timing of changing from the first range to the second range to be earlier than that in a case where the first difference is larger than the threshold value, and may set the second difference to be larger than that in the case where the first difference is larger than the threshold value. Thus, the information processing apparatus 100 may increase the possibility of finding a better value of the parameter. In a case where it is determined that the convergence of the evaluation value is relatively advanced, the information processing apparatus 100 may efficiently reduce a period of time for the parameter search.

The index indicating the nature of the problem may indicate a difficulty level of the problem, for example. As the difficulty level of the problem is higher, the information processing apparatus 100 may delay the timing of changing from the first range to the second range and reduce the second difference. Thus, the information processing apparatus 100 may increase the possibility of finding a better value of the parameter. When it is determined that the difficulty level of the problem is relatively low, the information processing apparatus 100 may efficiently reduce the period of time for the parameter search.

For example, the index indicating the nature of the problem is an index indicating at least one of the number of state variables, the type of a constraint, and the number of constraints that are included in the energy function. Based on these indices, the information processing apparatus 100 may appropriately determine the difficulty level of the problem.

As at least one of the number of state variables and the number of constraints that are included in the energy function is larger, the information processing apparatus 100 may delay the timing of changing from the first range to the second range and reduce the second difference. Thus, the information processing apparatus 100 may increase the possibility of finding a better value of the parameter. When it is determined that the difficulty level of the problem is relatively low, the information processing apparatus 100 may efficiently reduce the period of time for the parameter search.

When changing the candidate value range from the first range to the second range, the information processing apparatus 100 sets the first candidate value corresponding to the best evaluation value among the first candidate values acquired from the first range as a center value of the second range. Thus, the information processing apparatus 100 may increase the possibility of finding a better value of the parameter.

For example, the information processing apparatus 100 may calculate the best evaluation value corresponding to the first candidate value based on the best value of the energy function obtained by the search for the solution for a certain period of time in a case where the first candidate value is used, and the period of time taken to reach the best value. For example, the information processing apparatus 100 calculates the first evaluation value corresponding to the first candidate value based on the best value of the energy function obtained by the search for the solution for the certain period of time in the case where the first candidate value is used and the period of time taken to reach the best value. The information processing apparatus 100 acquires the best evaluation value from the plurality of first evaluation values corresponding to the plurality of first candidate values.

Thus, the information processing apparatus 100 may appropriately evaluate the candidate value of the parameter. For example, in a case of a problem of minimizing an energy, as the energy of a solution is lower, the value of the energy function is better and the evaluation of the corresponding candidate value is higher. As a period of time taken to reach the best value of the energy function is shorter, the evaluation of the corresponding candidate value is higher.

The information processing apparatus 100 determines, as a value of the parameter, the second candidate value corresponding to a best evaluation value among a plurality of second evaluation values obtained for a plurality of second candidate values acquired from the second range. By using the value of the parameter, the information processing apparatus 100 may search for a solution to the problem by the CPU 101. Alternatively, the information processing apparatus 100 may input the value of the parameter determined by the CPU 101 to a search unit such as the accelerator card 108 that searches for a solution to the problem, and cause the search unit to execute the search for the solution. Since a better parameter value may be determined by the parameter search, the information processing apparatus 100 may improve the solution finding performance by the search for the solution based on the value of the parameter. The search unit may be included in an apparatus other than the information processing apparatus 100.

A plurality of parameters may be subjected to the parameter search. The information processing apparatus 100 acquires a set of candidate values from respective first ranges that correspond to candidate values of a plurality of parameters and evaluates the set of candidate values according to a result of a search for a solution in a case where the set of candidate values is used, a plurality of times. The first range that is a candidate value acquisition range is determined for each parameter. The information processing apparatus 100 changes a first range of each of candidate values of a plurality of parameters to a second range narrower than the first range. The information processing apparatus 100 acquires a set of candidate values from the respective second ranges for the candidate values of the plurality of parameters, and evaluates the set of candidate values according to a result of a search for a solution in a case where the set of candidate values is used, a plurality of times. Before the change to the second range, the information processing apparatus 100 determines a timing at which the candidate value acquisition range for each parameter is changed from the first range to the second range and a second difference between the first range and the second range, based on at least one of a first difference between a best evaluation value among evaluation values calculated for each set of candidate values by the evaluation in which the first range is used and another evaluation value obtained by the evaluation before the evaluation of the best evaluation value, and an index indicating a nature of the problem according to an energy function. Thus, the information processing apparatus 100 may improve the efficiency of the parameter search.

For example, the search for the solution to the problem may be executed by a simulated annealing (SA) method or a replica-exchange method. The plurality of parameters may include at least one of a maximum temperature value and a minimum temperature value that are used in the SA method or the replica-exchange method. As described above, the plurality of parameters may include another parameter such as a decrease range of a temperature value in the SA method or a difference between adjacent temperature values in the replica-exchange method. Thus, the information processing apparatus 100 may improve the efficiency of the parameter search for the parameter that is used in the SA method or the replica-exchange method.

The information processing apparatus 100 may execute the following processing with respect to parameter search processing including first processing, second processing, and third processing. The first processing is processing in which acquiring a first candidate value from a first range that is a candidate value range of a parameter and evaluating the first candidate value according to a result of a search for a solution in a case where the first candidate value is used as a value of the parameter are performed a plurality of times. The second processing is processing of changing the candidate value range from the first range to a second range narrower than the first range. The third processing is processing in which acquiring a second candidate value from the second range and evaluating the second candidate value according to a result of a search for a solution in a case where the second candidate value is used as a value of the parameter are repeatedly performed. The problem information storage unit 110 stores information indicating an energy function of an Ising model corresponding to a problem. The information processing apparatus 100 determines a timing at which the first processing is ended and the second processing is executed, for example, a timing at which the candidate value range is changed from the first range to the second range, and a difference between the first range and the second range, based on an index indicating a nature of a problem corresponding to an energy function.

Thus, the information processing apparatus 100 may improve the efficiency of the parameter search. In this case, the parameter search processing may be executed by the information processing apparatus 100 or may be executed by an apparatus other than the information processing apparatus 100. When the parameter search processing is executed by an apparatus other than the information processing apparatus 100, the information processing apparatus 100 transmits information indicating the determined timing and information indicating the determined difference to the apparatus.

Information processing according to the first embodiment may be implemented by causing the processing unit 12 to execute a program. Information processing according to the second embodiment may be implemented by causing the CPU 101 to execute a program. The programs may be recorded in the recording medium 33 that is computer-readable.

For example, the programs may be circulated by distributing the recording medium 33 that records the programs. The programs may be stored in another computer and distributed via a network. For example, a computer may store (install) the programs recorded in the recording medium 33 or the programs received from another computer in the storage device such as the RAM 102 or the HDD 103, read the program from the storage device, and execute the program.

Regarding embodiments including the first and second embodiments described above, the following appendixes are further disclosed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus of searching for a solution of a combinatorial optimization problem using an Ising device configured to perform an Ising model computation, the information processing apparatus comprising:

a memory configured to store information that indicates an energy function of an Ising model converted from the combinatorial optimization problem; and a processor coupled to the memory and the Ising device, the processor being configured to perform processing including:

(a) obtaining the information stored in the memory;

(b) performing a first processing using the Ising device for a first number of iterations, the first processing including:

(b-1) obtaining a first candidate value from a first range to cause the Ising device to search for a first solution of the energy function of the Ising model using the first candidate value, the first range being a candidate value range of a parameter to be used for a search for a solution of the problem based on the energy function, and (b-2) evaluating the first candidate value according to a result of the search of the first solution obtained from the Ising device;

(c) changing the candidate value range from the first range to a second range narrower than the first range after completion of the performing the first processing for the first number of iterations; and (d) performing a second processing using the Ising device for a second number of iterations, the second processing including:

(d-1) obtaining a second candidate value from the second range to cause the Ising device to search for a second solution of the energy function of the Ising model using the second candidate value, and (d-2) evaluating the second candidate value according to a result of the search of the first solution obtained from the Ising device;

the performing of the first processing includes:

(e) determining, based on a first difference and after completion of the performing the first processing a predetermined times less than the first number of iterations, a timing at which the candidate value range is changed from the first range to the second range and a second difference between the first range and the second range, the first difference being a difference between a best evaluation value and another evaluation value, the best evaluation value being any one of a plurality of first evaluation values obtained by the performing of the evaluating in the first processing the predetermined times within the first number of iterations, the another evaluation value being an evaluation value obtained by the evaluating in the first processing performed before the first processing of the best evaluation value, the determining of the timing is configured to decrease the first number of iterations in a case where the first difference is equal to or less than a threshold value, thereby advancing the timing as compared with a case where the first difference is more than the threshold value, and the determining of the second difference is configured to increase, as compared with a case where the first difference is more than the threshold value, the second difference in a case where the first difference is equal to or less than the threshold value.

2. The information processing apparatus according to claim 1, wherein the determining of the timing is configured to delay the timing as the first difference increases, the determining of the second difference is configured to decrease the second difference as the first difference increases.

3. The information processing apparatus according to claim 1, the processing further comprising:

obtaining an index that indicates the nature of the problem, the index indicating a difficulty level of the problem, and determining, before the performing of the first processing, the first number of iterations and the second difference based on the index, wherein the determining of the first number of iterations is configured to increase the first number of iterations as the difficulty level increases, and the determining of the second difference is configured to decrease the second difference as the difficulty level increases.

4. The information processing apparatus according to claim 3, wherein the index that indicates the nature of the problem is an index that indicates at least any one of: the number of state variables in the energy function, a type of a constraint in the energy function, or the number of constraints in the energy function.

5. The information processing apparatus according to claim 4, wherein the determining of the first number of iterations is configured to increase the first number of iterations as at least any one of the number of state variables or the number of constraints increases, and the determining of the second difference is configured to decrease the second difference as at least any one of the number of state variables or the number of constraints increases.

6. The information processing apparatus according to claim 1, wherein the changing of the candidate value is configured to set, as a center value of the second range, the first candidate value that corresponds to the best evaluation value among the first candidate values obtained from the first range.

7. The information processing apparatus according to claim 1, the processing further including calculating the best evaluation value that corresponds to the first candidate value based on a best value of the energy function and a period of time taken to reach the best value, the best value being any one of values obtained by the search for a certain period of time in a case where the first candidate value is used.

8. The information processing apparatus according to claim 1, the processing further including:

determining, as a value of the parameter, the second candidate value that corresponds to a best evaluation value among a plurality of second evaluation values obtained for a plurality of the second candidate values obtained from the second range, and obtaining a result of the search for a solution to the problem, by executing the search for a solution to the problem by using the determined value of the parameter, or by inputting the determined value of the parameter to a search processing circuit configured to perform the search to cause the search processing circuit to execute the search.

9. The information processing apparatus according to claim 1, wherein there are a plurality of parameters to be used as the parameter, the first processing is configured to obtain a first set of candidate values by obtaining, for each of the plurality of parameters, the candidate value from the first range, and evaluate the first set of the candidate values according to a result of the search in a case where the first set of the candidate values is used, the changing of the candidate value range is configured to change, for each candidate value in the first set of candidate values, the candidate value range from the first range to the second range, the second processing is configured to obtain a second set of candidate values by obtaining, for each of the plurality of parameters, the candidate value from the second range, and evaluate the second set of the candidate values according to a result of the search in a case where the second set of the candidate values is used, and the determining is configured to determine the timing and the second difference based on at least any one of the first difference or the index, the first difference being a difference between a best evaluation and another evaluation value, the best value being any one of a plurality of evaluation values calculated by the performing of the first processing the plurality of times, the another evaluation value being an evaluation value obtained by the first processing performed before the first processing of the best evaluation value, the index indicating the nature of the problem according to the energy function.

10. The information processing apparatus according to claim 9, wherein the search for a solution to the problem is executed by a simulated annealing method or a replica-exchange method, and a plurality of the parameters include at least one of a maximum temperature value and a minimum temperature value to be used in the simulated annealing method or the replica-exchange method.

11. An information processing method implemented by a computer of searching for a solution of a combinatorial optimization problem using an Ising device configured to perform an Ising model computation, the method comprising:

(a) obtaining, from a memory of the computer, information that indicates an energy function of an Ising model converted from the combinatorial optimization problem;

(b) performing a first processing using the Ising device for a first number of iterations, the first processing including, (b-1) obtaining a first candidate value from a first range to cause the Ising device to search for a first solution of the energy function of the Ising model using the first candidate value, the first range being a candidate value range of a parameter to be used for a search for a solution of the problem based on the energy function, and (b-2) evaluating the first candidate value according to a result of the search of the first solution obtained from the Ising device;

(c) changing the candidate value range from the first range to a second range narrower than the first range after completion of the performing the first processing for the first number of iterations; and (d) performing a second processing using the Ising device for a second number of iterations, the second processing including (d-1) obtaining a second candidate value from the second range to cause the Ising device to search for a second solution of the energy function of the Ising model using the second candidate value, and (d-2) evaluating the second candidate value according to a result of the search of the first solution obtained from the Ising device;

the performing of the first processing includes:

(e) determining, based on a first difference and after completion of the performing the first processing a predetermined times less than the first number of iterations, a timing at which the candidate value range is changed from the first range to the second range and a second difference between the first range and the second range, the first difference being a difference between a best evaluation value and another evaluation value, the best evaluation value being any one of a plurality of first evaluation values obtained by the performing of the evaluating in the first processing the predetermined times within the first number of iterations, the another evaluation value being an evaluation value obtained by the evaluating in the first processing performed before the first processing of the best evaluation value, the determining of the timing is configured to decrease the first number of iterations in a case where the first difference is equal to or less than a threshold value, thereby advancing the timing as compared with a case where the first difference is more than the threshold value, and the determining of the second difference is configured to increase, as compared with a case where the first difference is more than the threshold value, the second difference in a case where the first difference is equal to or less than the threshold value.

12. A non-transitory computer-readable storage medium storing a program of searching for a solution of a combinatorial optimization problem using an Ising device configured to perform an Ising model computation, the program causing a computer coupled to the Ising device to perform processing comprising:

(a) obtaining, from a memory of the computer, information that indicates an energy function of an Ising model converted from the combinatorial optimization problem;

(b) performing a first processing using the Ising device for a first number of iterations, the first processing including (b-1) obtaining a first candidate value from a first range to cause the Ising device to search for a first solution of the energy function of the Ising model using the first candidate value, the first range being a candidate value range of a parameter to be used for a search for a solution of the problem based on the energy function, and (b-2) evaluating the first candidate value according to a result of the search of the first solution obtained from the Ising device;

(c) changing the candidate value range from the first range to a second range narrower than the first range after completion of the performing the first processing for the first number of iterations; and (d) performing a second processing using the Ising device for a second number of iterations, the second processing including, (d-1) obtaining a second candidate value from the second range to cause the Ising device to search for a second solution of the energy function of the Ising model using the second candidate value, and (d-2) evaluating the second candidate value according to a result of the search of the first solution obtained from the Ising device;

the performing of the first processing includes:

(e) determining, based on a first difference and after completion of the performing the first processing a predetermined times less than the first number of iterations, a timing at which the candidate value range is changed from the first range to the second range and a second difference between the first range and the second range, the first difference being a difference between a best evaluation value and another evaluation value, the best evaluation value being any one of a plurality of first evaluation values obtained by the performing of the evaluating in the first processing the predetermined times within the first number of iterations, the another evaluation value being an evaluation value obtained by the evaluating in the first processing performed before the first processing of the best evaluation value, the determining of the timing is configured to decrease the first number of iterations in a case where the first difference is equal to or less than a threshold value, thereby advancing the timing as compared with a case where the first difference is more than the threshold value, and the determining of the second difference is configured to increase, as compared with a case where the first difference is more than the threshold value, the second difference in a case where the first difference is equal to or less than the threshold value.

* * * * *